United States Patent
Bogues et al.

(10) Patent No.: US 7,218,326 B1
(45) Date of Patent: May 15, 2007

(54) SPLINE MANIPULATION TOOL

(75) Inventors: Michael A. Bogues, Brighton, MI (US);
Jingyang John Chen, Novi, MI (US);
Kenneth Jamieson Hill, South Lyon, MI (US)

(73) Assignee: Autodesk, Inc., San Rafael, CA (US)

( * ) Notice: Subject to any disclaimer, the term of this patent is extended or adjusted under 35 U.S.C. 154(b) by 237 days.

(21) Appl. No.: 10/866,314

(22) Filed: Jun. 10, 2004

Related U.S. Application Data

(60) Provisional application No. 60/477,809, filed on Jun. 11, 2003.

(51) Int. Cl.
*G06T 11/20* (2006.01)
(52) U.S. Cl. .................................. 345/442; 345/441
(58) Field of Classification Search ............. 345/422, 345/652, 663, 678, 441, 442
See application file for complete search history.

(56) References Cited

U.S. PATENT DOCUMENTS

| | | | | |
|---|---|---|---|---|
| 6,154,221 A | * | 11/2000 | Gangnet | ..................... 345/442 |
| 6,441,823 B1 | * | 8/2002 | Ananya | ..................... 345/442 |
| 6,636,217 B1 | | 10/2003 | Hill | |

OTHER PUBLICATIONS

2D Dimensional Constraint Manager, D-CUBED, retrieved from http://www.d-cubed.co.uk/prod_DCM2_intro.htm on Jun. 4, 2004.

* cited by examiner

*Primary Examiner*—Kee M. Tung
*Assistant Examiner*—Michelle K. Lay
(74) *Attorney, Agent, or Firm*—Fish & Richardson P.C.

(57) ABSTRACT

Methods, computer program products and systems for manipulating a spline are described. A spline can be displayed. A tangent bar that is tangent to a point on the spline and/or a curvature bar at the point can be displayed. A user input can be received defining one or more constraints on at least one of the tangent bar or the curvature bar, and the shape of the spline can be modified based on the one or more constraints.

58 Claims, 19 Drawing Sheets

SPLINE MANIPULATION TOOL

CROSS-REFERENCE TO RELATED APPLICATIONS

This application claims priority to pending Provisional U.S. Application Ser. No. 60/477,809, filed on Jun. 11, 2003 entitled "BOWTIE SPLINES", which application is incorporated herein by reference in its entirety.

TECHNICAL FIELD

This invention relates to a tool for manipulating a representation of a spline.

BACKGROUND

A graphics application, such as a computer-aided design (CAD) program, can be used to generate two dimensional and three dimensional representations of objects. A user can draw a shape typically using one or more lines, arcs or splines. Tools can be provided to a user to facilitate manipulating, sizing and replicating various components of a drawing. For example, a spline manipulation tool is provided in CAD software available from SolidWorks Corporation of Concord, Mass. A line that is tangent to a point on the spline that is to be manipulated is displayed to a user. The user can manipulate the tangent line. The spline is required to remain tangent to the tangent line, and is thereby modified in response to the user's manipulation of the tangent line. Subsequent manipulations to the spline, for example, using a tangent line at a different point on the spline, can interfere with earlier modifications to the spline, i.e., the modifications are not persistent.

Another example of a spline manipulation tool is provided in CAD software available from think3, Inc. of Cincinnati, Ohio. A line that is tangent to a point on the spline that is to be manipulated is displayed to a user at either an endpoint or a midpoint. The tangent line can be rotated to modify the spline, which stays tangent to the tangent line. The tangent line can also be lengthened or shortened, to lengthen or shorten the length of the spline that is substantially tangential to the tangent line. Modifications to the spline can persist during subsequent modifications to the spline at other points along the spline.

SUMMARY

This invention relates to a tool for manipulating a representation of a spline. In general, in one aspect, the invention features method and apparatus, including computer program products, for modifying a spline including displaying a spline and displaying a tangent bar tangent to a point on the spline. A user input is received defining one or more constraints on the tangent bar, where a constraint restricts at least one of a dimension, orientation or position of the tangent bar. The spline is modified based on the one or more constraints on the tangent bar.

Implementations can include one or more of the following. The one or more constraints can include a constraint on an orientation of the tangent bar relative to a coordinate system. For example, the orientation of the tangent bar can be constrained as horizontal or vertical relative to the coordinate system.

The spline can be included in an assembly of graphical elements having at least one other graphical element, and the one or more constraints can include a constraint on an orientation of the tangent bar relative to the graphical element. For example, the assembly can include a linear graphical element, and the one or more constraints can include a constraint wherein the orientation of the tangent bar is perpendicular, parallel or collinear to the linear graphical element. In another example, the assembly can include a curved graphical element, and the one or more constraints can include a constraint wherein the orientation of the tangent bar is tangent to the curved graphical element. The spline can be included in an assembly of graphical elements having at least one other graphical element including a linear graphical element, and the one or more constraints can include a constraint wherein the dimension of the tangent bar is equal to a dimension of a linear graphical, such as a second tangent bar, i.e., a tangent bar associated with a different point on the spline.

The one or more constraints can include a constraint on a dimension of the tangent bar, and modifying the spline can include modifying how much of a length of the spline is substantially tangential to the tangent bar. For example, where the constraint includes increasing the dimension of the tangent bar, then modifying the spline can include increasing how much of the length of the spline that is substantially tangential to the tangent bar. In another example, the constraint can include decreasing the dimension of the tangent bar, and modifying the spline can include decreasing how much of the length of the spline that is substantially tangential to the tangent bar.

In general, in another aspect, the invention features methods and apparatus, including computer program products, for manipulating a spline, including displaying a spline and displaying a curvature bar at a point on the spline, the curvature bar having a radius of curvature. A user input is received defining the radius of curvature of the curvature bar. The curvature of the spline at the point is modified in accordance with the radius of curvature of the curvature bar.

Implementations can include one or more of the following. A user input can be received defining one or more constraints on the curvature bar, and modifying the curvature of the spline can include modifying a radius of curvature of the spline based on the one or more constraints on the curvature bar. For example, one of the constraints can include a constraint that the radius of curvature of the curvature bar is approximately infinite, and modifying the curvature of the spline can include modifying the spline to be approximately flat in a region including the point. The spline can be included in an assembly of graphical elements having at least one other graphical element, and the constraints can include a constraint on the radius of curvature of the curvature bar relative to the graphical element. For example, the assembly can include a curved graphical element, and the one or more constraints can include a constraint where the radius of curvature of the curvature bar is equal to a radius of curvature of the curved graphical element, or a constraint where the curvature bar is concentric to the curved graphical element.

In general, in another aspect, the invention features methods and apparatus, including computer program products, for manipulating a spline, including displaying a spline, displaying a tangent bar tangent to a point on the spline and displaying a curvature bar at the point on the spline. A user input is received defining one or more constraints on at least one of the tangent bar or the curvature bar, and the shape of the spline is modified based on the one or more constraints.

In general, in another aspect, the invention features a system for manipulating a spline within a design, the system including a geometric constraint solver, a spline solver and a tangent bar engine. The geometric constraint solver is configured to resolve constraints applied to graphical elements comprising a design, including constraints applied to a tangent bar associated with a graphical element included in the design, and to provide geometric input to a spline solver. The spline solver is configured to generate a spline based on geometric input received from the geometric constraint solver. The tangent bar engine is configured to display a tangent bar that is tangent to a point on a spline, receive user input defining one or more constraints on the tangent bar, and provide the one or more constraints to the geometric constraint solver. The one or more constraints are used by the geometric constraint solver to generate the geometric input provided to the spline solver.

Implementations can include one or more of the following. The one or more constraints can include a restriction on at least one of a dimension, orientation or position of the tangent bar. For example, the one or more constraints can include a constraint on an orientation of the tangent bar relative to a coordinate system, such as horizontal or vertical to the coordinate system. The one or more constraints can include a constraint on an orientation of the tangent bar relative to a graphical element included in the design.

For example, where the graphical element is a linear element, the orientation of the tangent bar can be constrained to be parallel, perpendicular or collinear to the linear element. In another example, where the graphical element is a curve, the orientation of the tangent bar can be constrained to be tangential to the curve. The one or more constraints can include a constraint on a dimension of the tangent bar relative to a graphical element included in the design. For example, where the graphical element is a linear element, a dimension of the tangent bar can be constrained to be equal to a dimension of the linear element, such as a second tangent bar.

The geometric constraint solver can be further configured to resolve constraints including constraints applied to a curvature bar associated with a graphical element included in the design, and the system can further include a curvature bar engine. The curvature bar engine can be configured to display a curvature bar at a point on a spline, the curvature bar having a radius of curvature, receive a user input defining one or more constraints on the curvature bar, and provide the one or more constraints to the geometric constraint solver. The one or more constraints can be used by the geometric constraint solver to generate the geometric input provided to the spline solver.

In general, in another aspect, the invention features a system for manipulating a spline within a design, including a geometric constraint solver, a spline solver and a curvature bar engine. The geometric constraint solver is configured to resolve constraints applied to graphical elements comprising a design, including constraints applied to a curvature bar associated with a graphical element included in the design, and provide geometric input to a spline solver. The spline solver is configured to generate a spline based on geometric input received from the geometric constraint solver. The curvature bar engine is configured to display a curvature bar at a point on a spline, the curvature bar having a radius of curvature, receive a user input defining one or more constraints on the curvature bar, and provide the one or more constraints to the geometric constraint solver. The one or more constraints are used by the geometric constraint solver to generate the geometric input provided to the spline solver.

Implementations can include one or more of the following. The one or more constraints can include a constraint on the radius of curvature of the curvature bar relative to a graphical element included in the design. For example, where the graphical element is an arc, the radius of curvature of the curvature bar can be constrained to be equal to the radius of curvature of the arc, or a position of the curvature bar can be constrained to be concentric to the arc.

Implementations of the invention can realize one or more of the following advantages. Constraints can be applied to a tangent bar and/or curvature bar that is associated with a point on a spline. The constraints can include a dimensional constraint, a position constraint relative to a coordinate system or relative to another graphical element, including another tangent bar or curvature bar. Constraints allow a tangent bar or curvature bar, and therefore a spline, to be easily replicated. Constraints also allow a spline to dynamically change shape to maintain constraint relationships during editing. For example, a dimension of a tangent bar that is constrained relative to another tangent bar can dynamically change as the dimension of the other tangent bar is edited.

The Bowtie Engine can provide a link between the Geometric Constraint Solver and the Spline Solver, such that the construction of a spline can be parameterized. Changing the values of the parameters can create a family of related splines. For example, a design of a product that is available in three different sizes can be replicated in different sizes by changing the length parameters, such as the distances between fit points and the radii of curvature of related curvature bars. Uniform or non-uniform scaling can be achieved.

The curvature bar can be used to smoothly join a spline to another graphical element, such as an arc, within a design. For example, the curvature bar can be used at a point at which the spline joins the arc to make the radius of curvature of the spline at that point approximately equal to the radius of curvature of the arc to be joined to the spline at that point.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
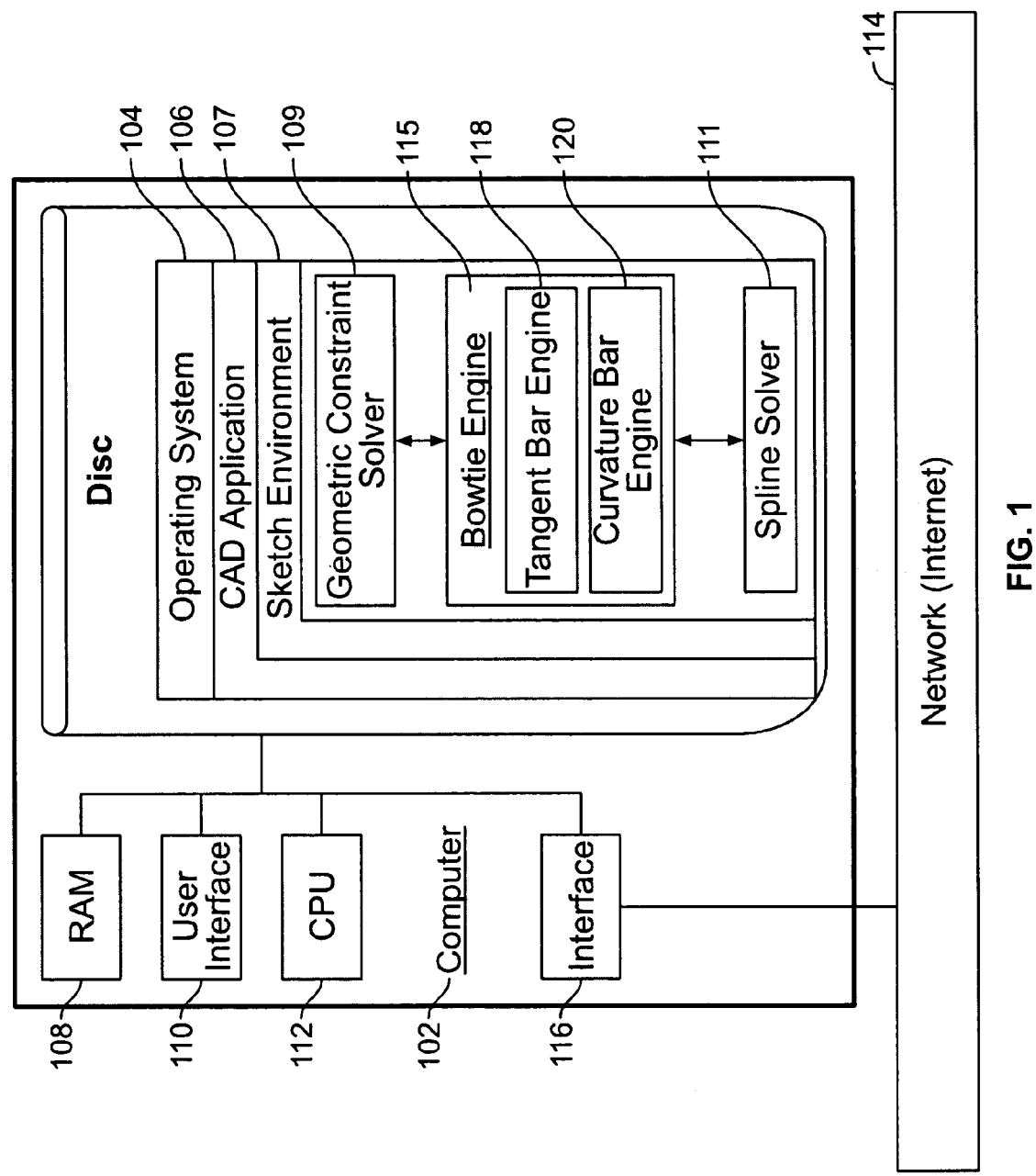
FIG. 1 is a schematic representation of a system including a computer executing a CAD application.

Referring to FIG. 1, a CAD application 106 can execute in a computer 102 executing an operating system 104. An exemplary computer 102 is shown, and includes a Random Access Memory (RAM) 108, a user interface 110, e.g., a computer monitor, mouse and/or keyboard, and a Central Processing Unit (CPU) 112. Optionally, if the computer 102 can connect to other computers and/or devices over a network connection 114, such as an Internet connection, the computer 102 can include an external interface 116. The CAD application 106 can be, for example, the Autodesk Inventor® software application available from Autodesk, Inc. of San Rafael, Calif.

The CAD application 106 can provide functionality for a user to create a 2D or 3D design, for example, using lines, arcs and splines. The CAD application 106 can include a Sketch Environment 107. A user of the CAD application 106 can use tools available in the Sketch Environment 107 to create a sketch on a sketch plane using lines, arcs and other geometry. A sketch can define the sizes and shapes of profiles, paths and hole placements. Profiles, paths and hole centers are consumed when features of a CAD assembly are created.

Within the Sketch Environment 107, a Geometric Constraint Solver 109 and a Spline Solver 111 can function to resolve geometric constraints and provide a spline consistent with the constraints. A Geometric Constraint Solver 109 can include functionality to resolve constraints applied to graphical elements in a design. For example, graphical elements can be constrained by dimension, position and/or orientation. Constraints applied to a first graphical element can be relative to a coordinate system or to attributes (e.g., orientation, position, dimension) of a second graphical element. For example, a first graphical element can be constrained to have a length dimension equal to a length of a second graphical element. If the length dimension of the second graphical element is changed, than the Geometric Constraint Solver 109 modifies the length dimension of the first graphical element accordingly, to resolve the constraint relationship. A Spline Solver 111 can receive as input attributes of graphical elements forming a design, for example, a modified length dimension for the first graphical element, and generates a spline consistent with the input or modifies an existing spline.

A Bowtie Engine 115 can include a Tangent Bar Engine 118 and/or a Curvature Bar Engine 120, to facilitate a user's manipulation of splines included in a design. In one implementation, the Tangent Bar Engine 118 can be used to present a tangent tool to a user and the Curvature Bar Engine 120 can be used to present a curvature tool and flat tool to a user. For example, referring to FIGS. 2A–D, a portion of an exemplary graphical user interface 200 is shown that can be used to present the tangent, curvature and flat tools to a user. The graphical user interface 200 can be, for example, a drop down menu from a tool bar and a user can use a keyboard or mouse to highlight the tool or tools the user would like to activate.

Figure 2A:
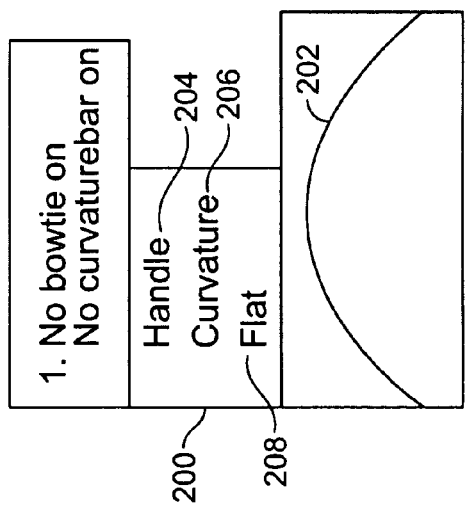
FIGS. 2A–D are schematic representations of a user interface including a tangent tool, curvature tool and flat tool.
Figure 2B:
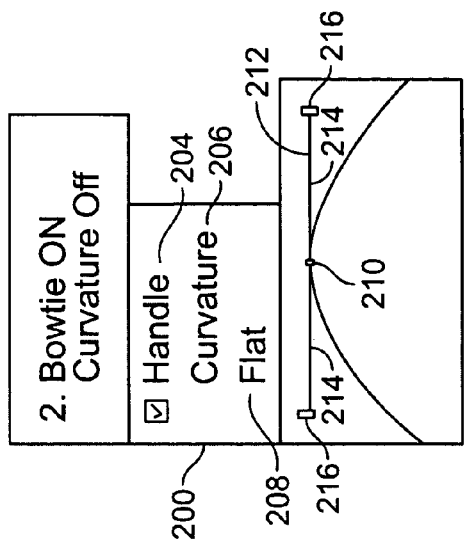

FIG. 2A shows an example of a spline 202 displayed to a user on a user interface 110. The graphical user interface 200 is shown, which presents to the user the tangent tool 204, the curvature tool 206 and the flat tool 208. In the implementation shown, a tag is included for each tool, and a checkbox shows whether the tool is activated. The tag for the tangent tool 204 is "handle" (tangent bars are sometimes referred to as handle bars), the tag for the curvature tool 206 is "curvature" and the tag for the flat tool 208 is "flat". None of the tools are activated in FIG. 2A. Referring to FIG. 2B, a user has activated the tangent tool 204 at a point 210 on the spline 202. For example, a user can select the tangent tool 204 and point 210 on the spline 202 using a mouse. A tangent bar 212 is displayed at the point 210. The tangent bar 212 can include distal portions 214 arranged symmetrically about the point 210 and nodes 216 at either distal end. Other configurations are possible, including more, fewer or no nodes 216 and distal portions that are not symmetric. The tangent bar 212 can be manipulated by the user to change the shape of the spline 202, as is described further below.

Figure 2C:
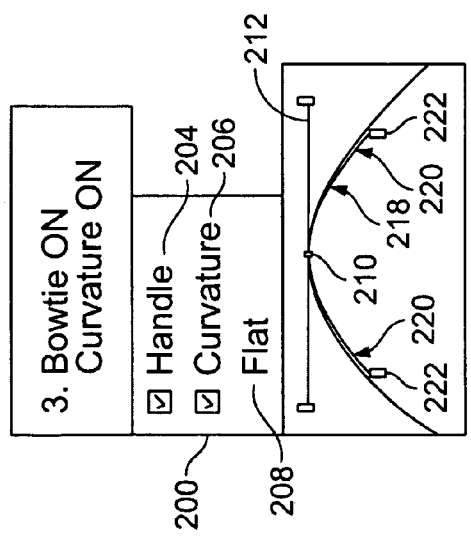

Referring to FIG. 2C, a user has activated the tangent tool 204 and the curvature tool 206. The tangent bar 212 is displayed at the point 210, as well as a curvature bar 218. For example, a user can select the tangent tool 204, curvature tool 206 and point 210 on the spline 202 using a mouse. The curvature bar 218 can include distal portions 220 arranged symmetrically about the point 210 and nodes 222 at either distal end. Other configurations are possible, including more, fewer or no nodes 222. The curvature bar 218 can be manipulated by a user to change the radius of curvature of the spline 202 at the point 210, as is described further below.

The point 210, tangent bar 212 and the curvature bar 218 in combination can be referred to, in one implementation, as a "bowtie".

Figure 2D:
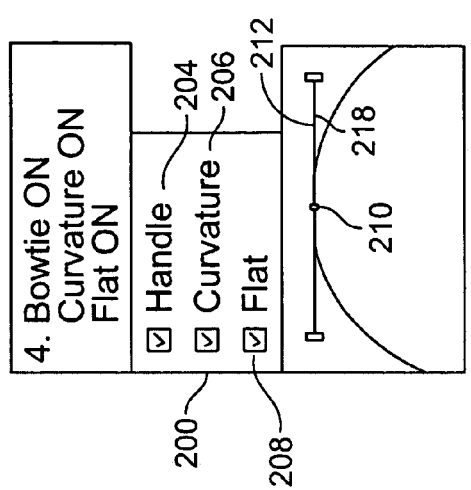

Referring to FIG. 2D, a user has activated the tangent tool 204, the curvature tool 206 and the flat tool 208. For example, a user can select the tangent tool 204, curvature tool 206, flat tool 208 and point 210 on the spline 202 using a mouse. The tangent bar 212 is displayed at the point 210. The curvature bar 218 is also displayed at the point 210, but is flat and is displayed collinear with the tangent bar 212. That is, activating the flat tool 208 modifies the radius of curvature of the curvature bar 218 to approach infinity, i.e., the curvature bar is flat. Thus, when the radius of curvature is infinite, the flat tool 208 can be used, and when the radius of curvature is greater than 0, the curvature tool 206 can be used. The change in the radius of curvature of the spline 202 from FIG. 2C to FIG. 2D illustrates the effect that changing the radius of curvature of the curvature bar 218, e.g., making the curvature bar 218 flat, can have on the shape of the spline 202.

In FIG. 1, the Bowtie Engine 115 is schematically represented as situated between the Geometric Constraint Solver 109 and the Spline Solver 111. Constraints applied to a tangent bar or a curvature bar can be resolved by the Geometric Constraint Solver 109, and the resulting geometric input (e.g., attributes such as dimension, position or orientation) can be input to the Spline Solver 111 to generate a resulting spline or to modify and existing spline.

Some types of constraints are discussed below in reference to the tangent bar engine 118 and the curvature bar engine 120, although other types of constraints can also be supported and resolved by the Geometric Constraint Solver 109. Some examples of constraints include the following (most of which are discussed in further detail below in reference to the tangent bar and curvature bar engines 118, 120):

1. distance constraints, e.g., constraints on dimensions between graphical elements in a design;
2. angle constraints, e.g., constraints on the dimensions of angles of graphical elements in a design, such as a tangent bar;
3. perpendicular, e.g., constraint that a tangent bar be perpendicular to another graphical element in a design;
4. parallel, e.g., constraint that a tangent bar be parallel to another graphical element in a design;
5. tangent, e.g., constraint that a tangent bar be tangent to a graphical element in a design (in addition to the spline with which the tangent bar is associated);
6. coincident, e.g., constraint that an endpoint of a spline be coincident with an endpoint of an arc in a design;
7. concentric, e.g., constraint that a curvature bar associated with a spline be concentric to another graphical element in a design;
8. collinear, e.g., constraint that a point on a spline be collinear with a linear graphical element in a design;
9. horizontal, e.g., constraint that a tangent bar be horizontal relative to a coordinate system;
10. vertical, e.g., constraint that a tangent bar be vertical relative to a coordinate system;
11. equal, e.g., constraint that a radius of curvature of a first curvature bar be equal to a radius of curvature of a second curvature bar;
12. fix, e.g., constraint fixing a dimension of a tangent bar; and
13. symmetric, e.g., constraint that a first curvature bar and a second curvature bar are symmetric about a given line and can be combined with an equal constraint on the radii of curvature of the curvature bars to create symmetry in the spline about the given line.

Tangent Bar Engine

Figure 3:
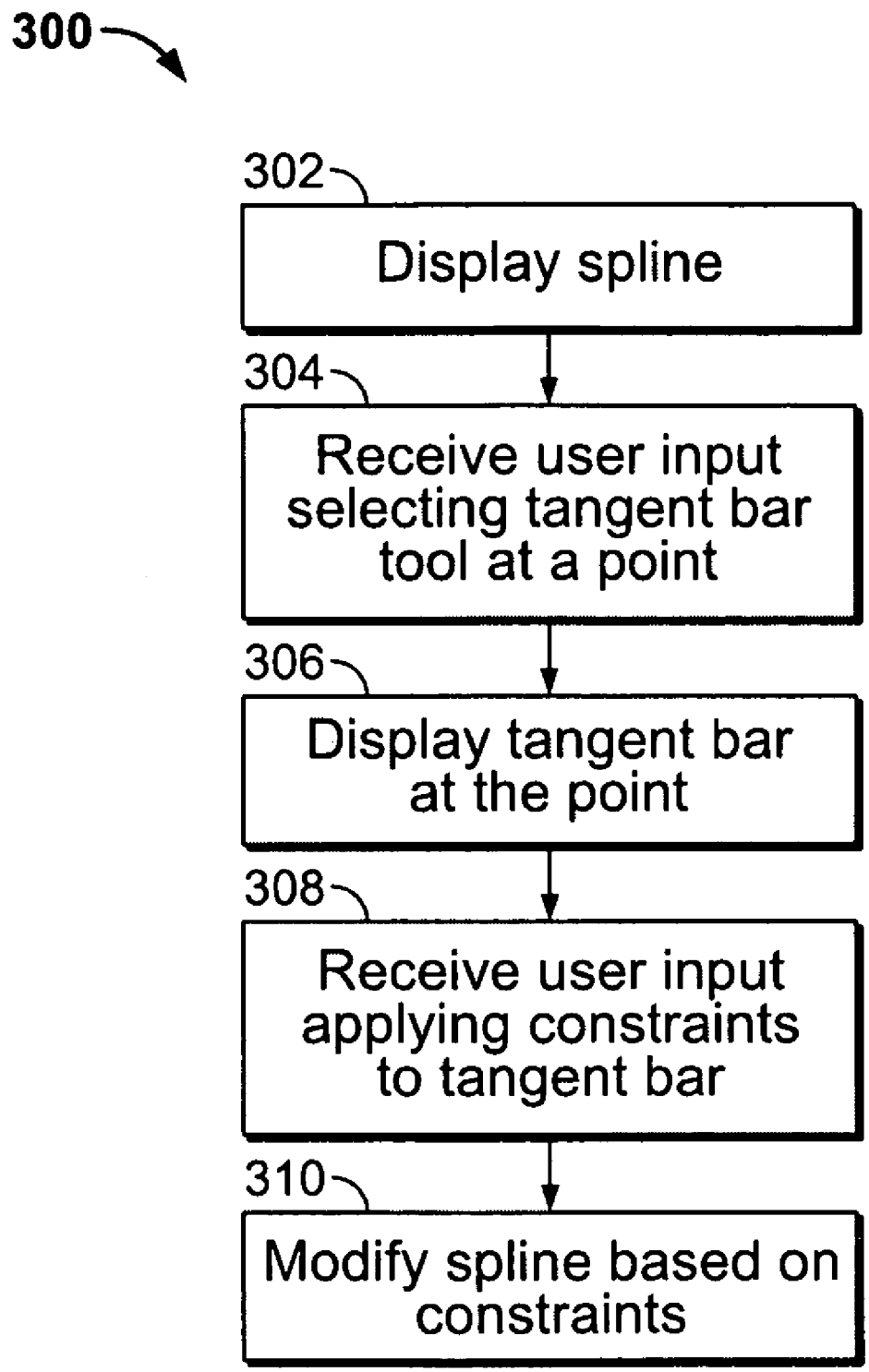
FIG. 3 is a flowchart showing a process for modifying a spline based on constraints applied to a tangent bar.

Referring to FIG. 3, a process 300 for using the tangent tool 204 to modify the shape of a spline is shown. Referring to FIGS. 4A–D, for illustrative purposes an exemplary spline 400 is shown that can be modified using the process 300.

Figure 4A:
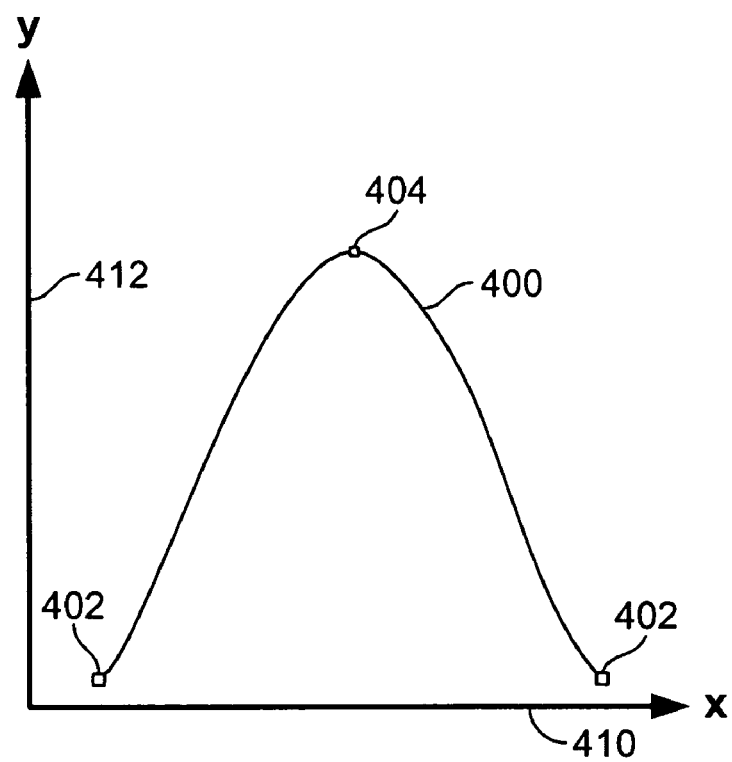
FIG. 4A is a schematic representation of a spline.

Referring to FIG. 4A, the spline 400 is displayed to the user, for example, on a computer display monitor (step 302). The spline 400 may have been created by the user using the CAD application 106 or may have been retrieved from a local data store, such as the RAM 108, or from a remote data store over the network connection 114. Points 402 represent the end points of the spline and point 404 can be a fit point. A fit point is a point through which the spline 400 must pass, and may or may not be positionally constrained (i.e., fixed). In other implementations other types of points can be used, for example, a control point, which may or may not be on the spline. A user input is received selecting to activate the tangent tool 204 at the point 404 (step 304). For example, a user can position a cursor over the point 404 and activate the right button of a mouse.

Figure 4B:
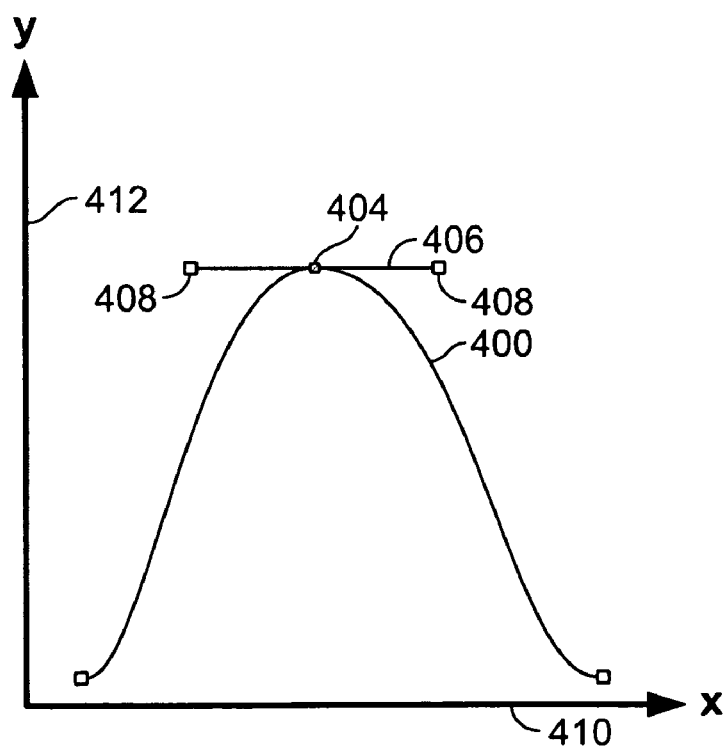
FIG. 4B is a schematic representation of a tangent bar associated with a point on the spline of FIG. 4A.

Referring to FIG. 4B, in response to the user request, a tangent bar 406 is displayed that passes through the point 404 (step 306). The tangent bar 406 is tangential to the spline 400 at the point 404. In the embodiment shown, the tangent bar 406 is symmetric about the point 404 and includes nodes 408 on either distal end. A user can modify the shape of the spline 400 by manipulating the tangent bar 406 from the original position into a second position. The second position defines constraints on the tangent bar 406 (step 308). For example, referring to FIG. 4C, the user has rotated the tangent bar 406 just over 90° to the right of the tangent bar's original position. In one implementation, the user can rotate the tangent bar 406 by positioning a cursor over the tangent bar 406, clicking on a mouse controlling the cursor and dragging the tangent bar 406 into a second position. Other techniques for allowing a user to position the tangent bar 406 can be used. The constraints can be, for example, relative to a coordinate system or relative to another tangent bar or graphical element of the design. In the example shown, the spline 400 is displayed in reference to a coordinate system having a x-axis 410 and a y-axis 412. In the second position, the tangent bar 406 is constrained to an angle of θ degrees from the x-axis when the point 404 is a units from the y-axis and b units from the x-axis.

Because the spline 400 must remain tangential to the tangent bar 406 at the point 404, and visa-versa, the shape of the spline 400 is modified as the tangent bar 406 is rotated into the second position. That is, the shape of the spline 400 is modified based on the constraints applied to the tangent bar 406 (step 310). The shape of the spline 400 in the region of the point 404 can thereby persist, even when other regions of the spline 400 are modified. That is, although other regions of the spline 400 can be modified, a tangent in the region of the point, such as the tangent bar 406, must form an angle of θ degrees from the x-axis when the point 404 is a units from the y-axis and b units from the x-axis.

An angular constraint can be applied to the tangent bar 406, such that the tangent bar is constrained to remain at an angle of θ degrees from the x-axis. If the point 404 is a non-fixed fit point and is moved, the tangent bar 406 maintains the angular position of θ degrees from the x-axis.

Figure 4C:
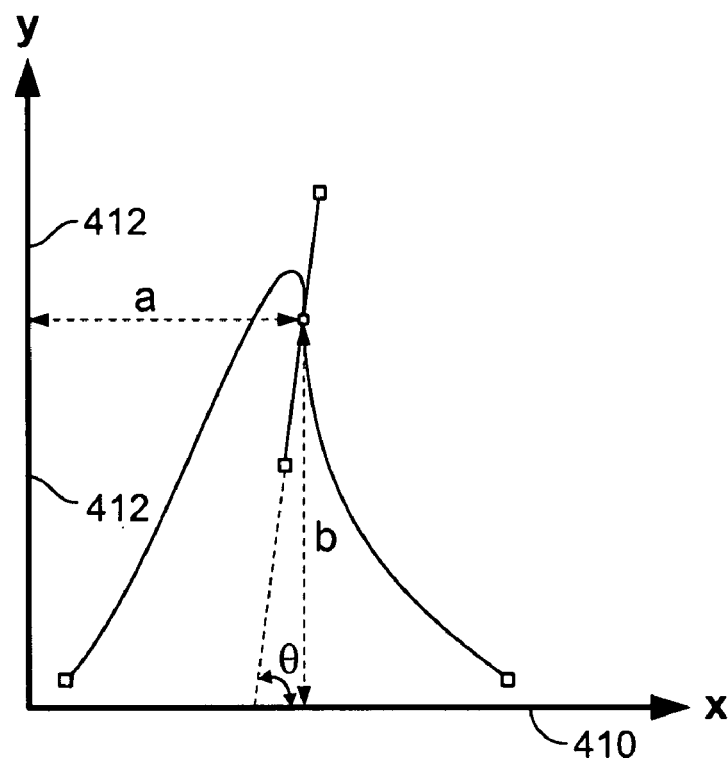
FIG. 4C is a schematic representation of the spline of FIG. 4B modified based on constraints applied to the tangent bar.
Figure 4D:
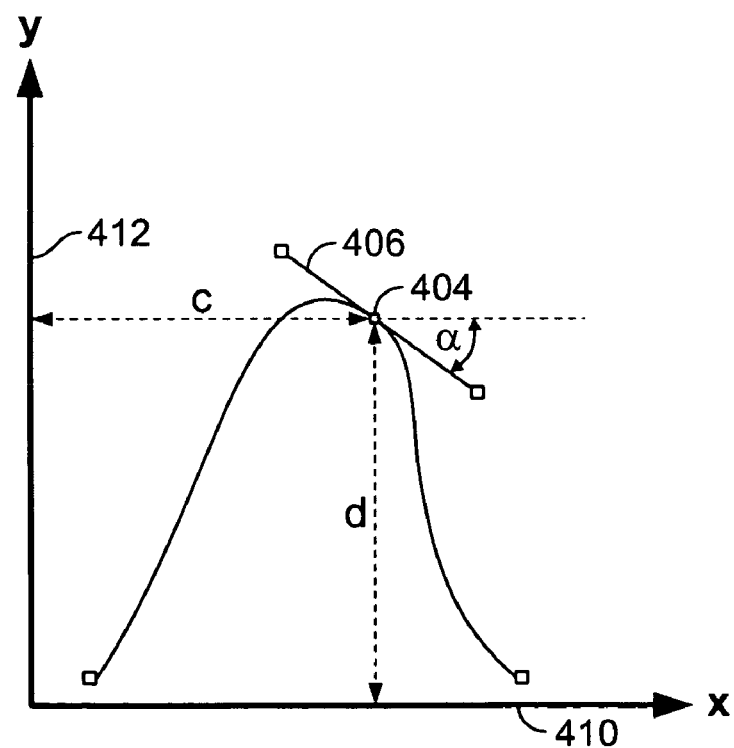
FIG. 4D is a schematic representation of the spline of FIG. 4C modified based on constraints applied to the tangent bar.

Applying constraints to the tangent bar 406 also allows replication of shapes of the spline 400. For example, consider the circumstance where the tangent bar 406 is subsequently rotated into a third position and the point 404 is moved, so that tangent bar 406 is an angle α from the x-axis when the point 404 is c units from the y-axis and d units from the x-axis, as shown in FIG. 4D. If the user desires to return to the previous shape of the spline 400 as shown in FIG. 4C, i.e., when the tangent bar 406 was in the second position, then the user can return the tangent bar 406 to the previous set of constraints. For example, the user can re-input the previous set of constraints, or in another implementation can retrieve the previous set of constraints from a data store (not shown) used for storing snap shots of versions of the spline, or sets of constraints. The point 404 is returned to a position a units from the y-axis and b units from the x-axis and the tangent bar 406 is at an angle of θ to the x-axis. The previous shape of the spline 400 is thereby restored, further illustrating the persistent nature of the constraints.

Figure 4E:
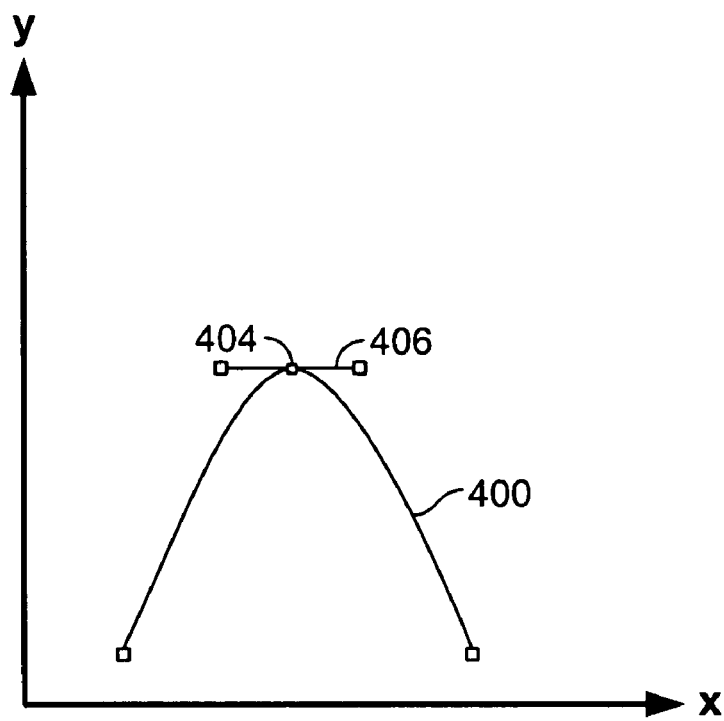
FIG. 4E is a schematic representation of a spline and a tangent bar associated with a point on the spline.
Figure 4F:
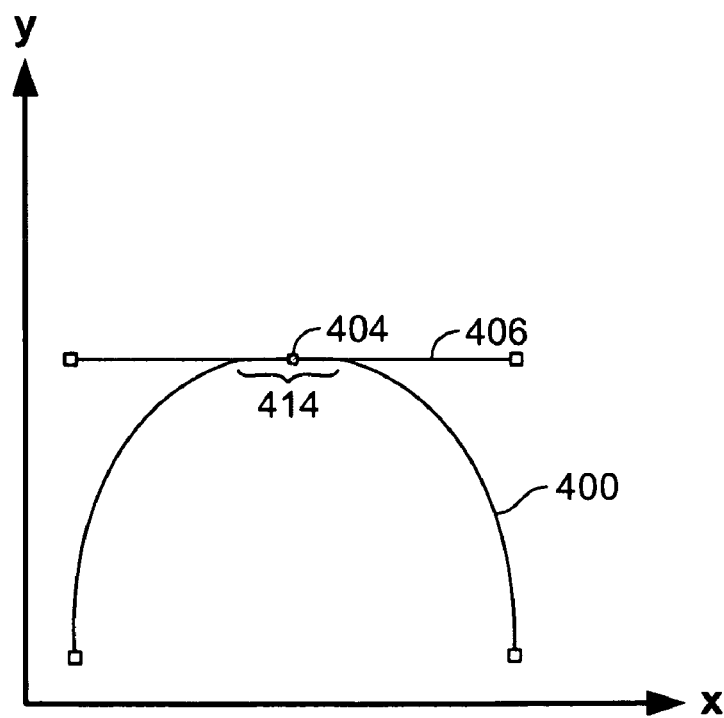
FIG. 4F is a schematic representation of the spline of FIG. 4E modified based on constraints applied to the tangent bar.

The dimension of the tangent bar 406 can be changed by the user. Increasing the dimension (i.e., lengthening) the tangent bar 406 causes the region about the point 404 that is tangential to the tangent bar 406 to be extended. For example, referring to FIG. 4E, the spline 400 is shown with the tangent bar 406 activated at the point 404. The user then applies constraints to the tangent bar 406, which in this example, are constraints on the dimension of the tangent bar 406. Referring to FIG. 4F, the dimension of the tangent bar 406 is increased symmetrically about the point 404. The shape of the spline 400 is modified based on the constraints, i.e., the shape is modified based on the tangent bar 406 having been lengthened. The region 414 about the point 404 of the modified spline (FIG. 4F) that is substantially tangential to the tangent bar 106 is relatively larger than the region 416 about the point 404 of unmodified spline (FIG. 4E), i.e., the spline 400 appears to hug the lengthened tangent bar 406 for a greater distance.

In one implementation, the tangent bar 406 can be generated using a technique for generating regularized tangents of curves disclosed in U.S. Pat. No. 6,636,217, entitled "Regularized Tangents in Computer Graphics", issued to Kenneth Hill on Oct. 21, 2003, the entire contents of which are hereby incorporated by reference.

The position of the tangent bar 406 can be changed by the user, in addition to rotating the tangent bar 406 about the point 404, as shown in FIGS. 4C and 4D. That is, the user can drag the tangent bar 406 into a second position, thereby dragging the point 404 to a second position, and modifying the spline 400 accordingly, such that the spline 400 remains tangential to the tangent bar 406 at the point 404.

Figure 5A:
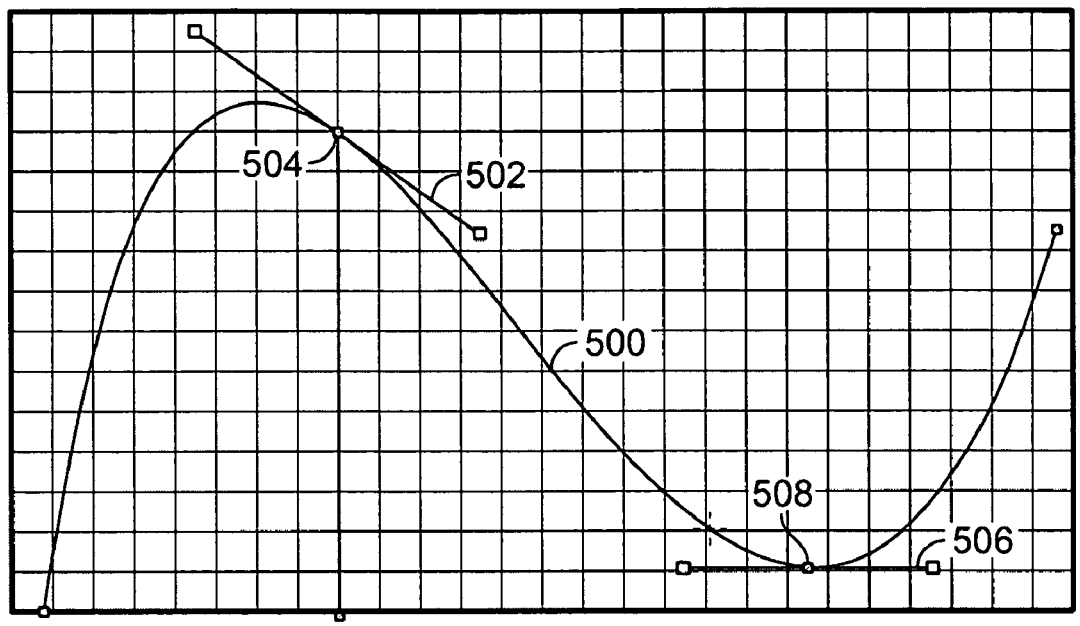
FIG. 5A is a schematic representation of a spline including points associated with first and second tangent bars.
Figure 5B:
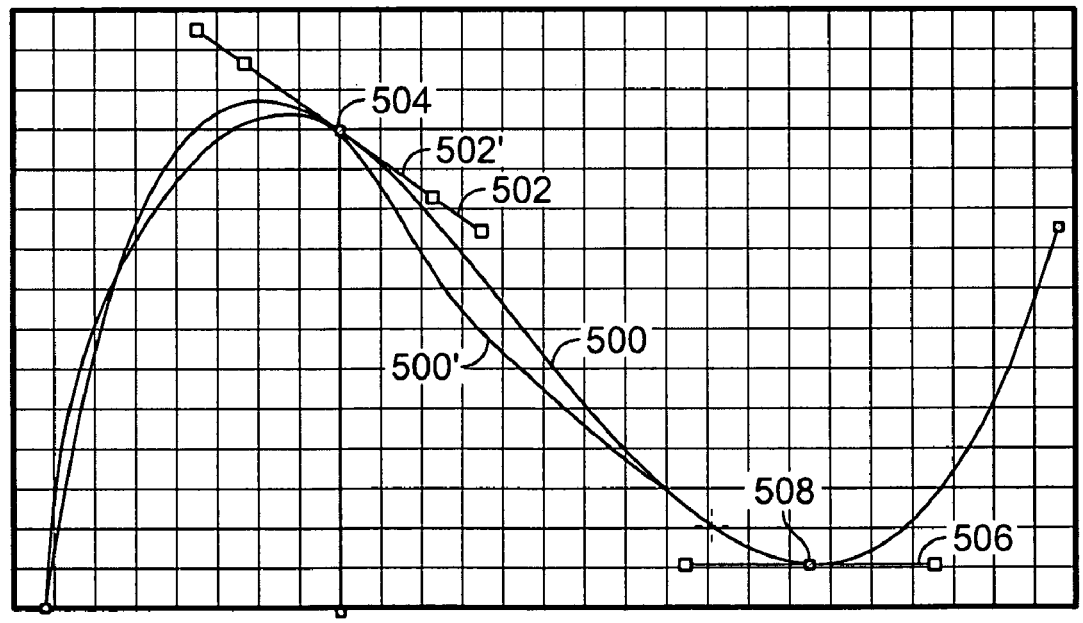
FIGS. 5B–F are schematic representations of the spline of FIG. 5A modified based on constraints applied to the first tangent bar.

A user can apply constraints to a tangent bar that are relative to either another tangent bar within the design or another graphical element within the design. For example, referring to FIG. 5A, a spline 500 is shown with a first tangent bar 502 at point 504 and a second tangent bar 506 at point 508. The first tangent bar 502 is longer than the second tangent bar 506. As such, the spline 500 hugs the first tangent bar 502 more tightly in the region of point 504, as compared to the spline 500 in the region of the point 508. A user can input a constraint that the first tangent bar 502 have the same dimension as the second tangent bar 506. The constraints can be maintained and resolved by the Geometric Constraint Solver 109. Referring to FIG. 5B, a modified first tangent bar 502' is shown with a reduced length that is approximately equal to the length of the second tangent bar 506. The modified spline 500' is shown. A portion of the spline has been modified so that the spline remains tangential to the first tangent bar 502' at point 504.

Figure 6:
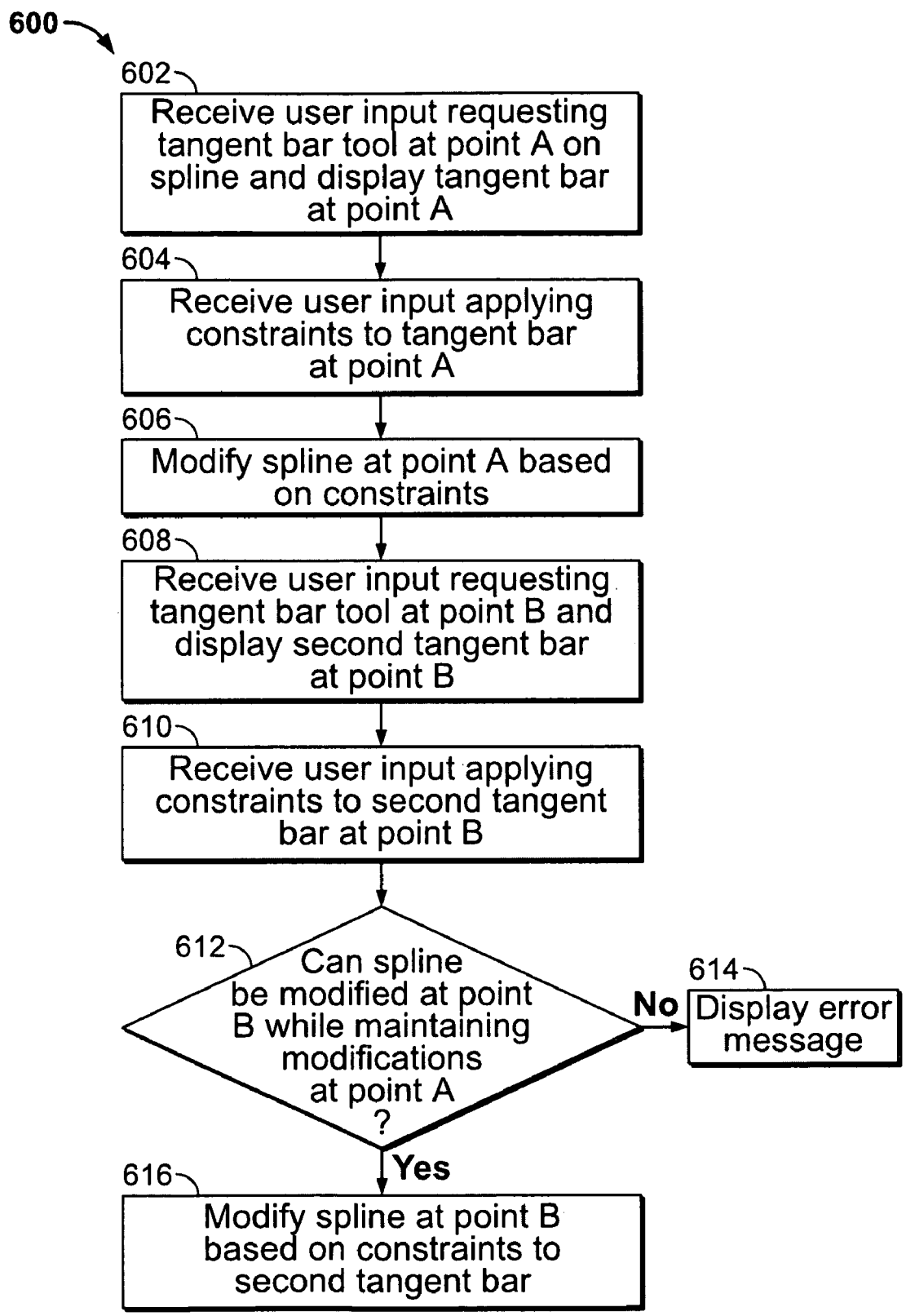
FIG. 6 is a flowchart showing a process for modifying a spline based on constraints applied to a tangent bar associated with a point on the spline.

The spline 500' remains tangential to the second tangent bar 506 at the point 508 due to the persistent nature of the constraints applied to the tangent bars, as described above. For example, referring to FIG. 6, a process 600 is shown for maintaining tangent bar constraints. A user input can be received requesting a tangent bar tool at point A, such as point 508, and a tangent bar, such as second tangent bar 506 is displayed (step 602). User input can be received applying constraints to the second tangent bar 506, for example, to position the second tangent bar 506 in the substantially horizontal position shown in FIG. 5B (step 604), and the spline 500 can be modified at point 508 based on the constraints (step 606). A user input request can be received for a tangent bar tool at point B, such as point 504, and another tangent bar, such as first tangent bar 502, is displayed (step 608). User input can be received applying constraints to the first tangent bar 502, for example, constraining the dimension of the first tangent bar 502 to be equal to the dimension of the second tangent bar 506, as described above (step 610).

Before the spline 500 can be modified accordingly, a determination is made as to whether the spline 500 can be modified at point 504 based on the constraints applied to the first tangent bar 502 while maintaining the modifications to the spline 500 at point 508 based on the constraints applied to second tangent bar 506 (decision step 612). If the latter modifications cannot be made while maintaining the earlier modifications ("no" branch of decision step 612), then an error message can be displayed to the user (step 614). If the latter modification can be made while maintaining the earlier modifications ("yes" branch of decision step 612), then the spline 500 is modified at point 504 based on the constraints applied to the first tangent bar 502 (step 616).

The modified spline 500' hugs the first tangent bar 502 to a lesser degree in the region of the point 504 as compared to the original spline 500. If the second tangent bar 506 is subsequently changed in dimension, for example, lengthened, the first tangent bar 502 will also be lengthened to maintain the constraint relationship between the dimensions of the first and second tangent bars 502, 506. The dimension of the first tangent bar 502 will not be able to be changed independent of the second tangent bar 506, unless and until the constraint is removed from the first tangent bar 502.

Figure 5C:
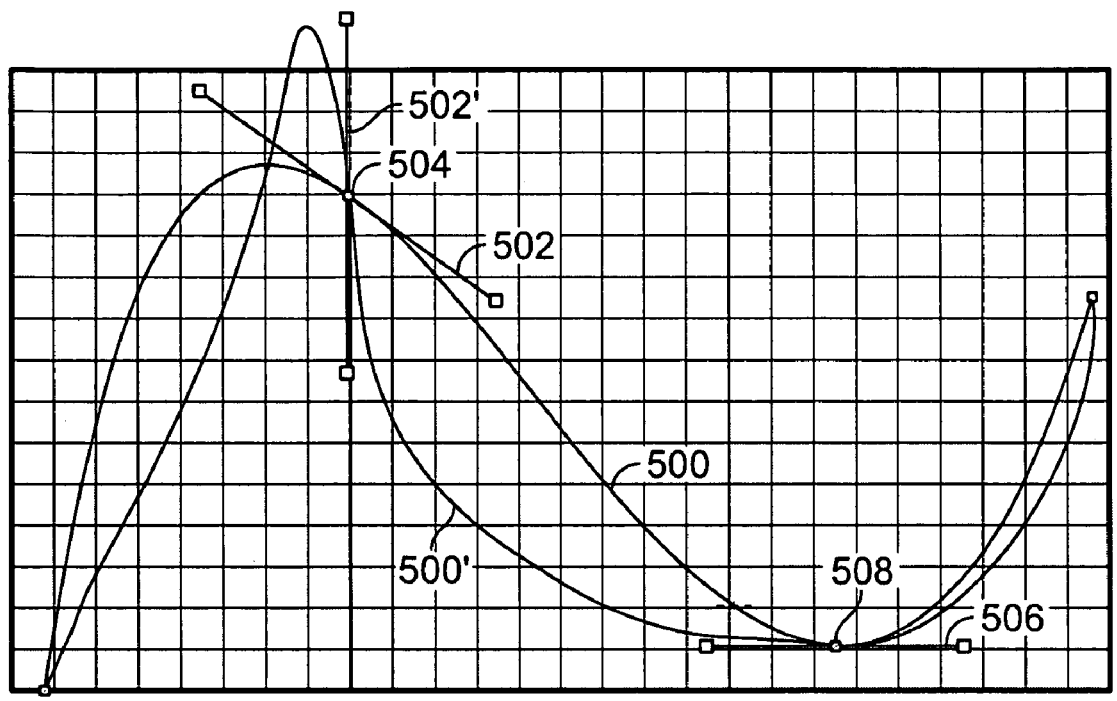

Referring to FIG. 5C, a user can input a constraint that the first tangent bar 502 be perpendicular to the second tangent bar 506. The modified spline 500' and modified first tangent bar 502' are shown. A portion of the spline has been modified so that the spline 500' remains tangential to the first tangent bar 502' at the point 504.

Figure 5D:
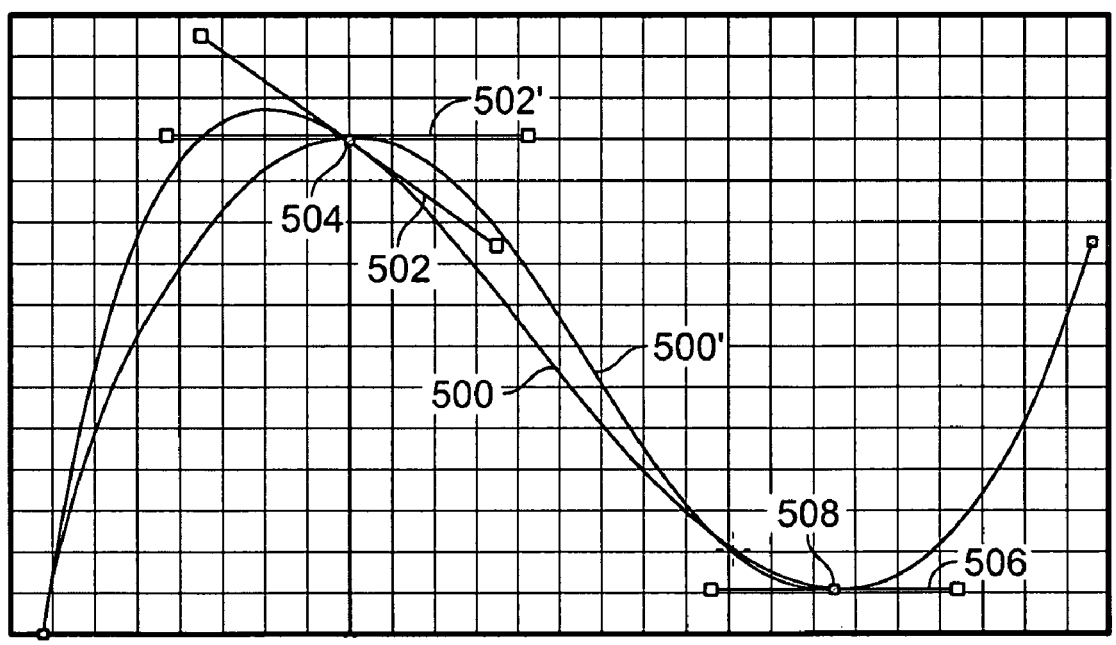

Referring to FIG. 5D, a user can input a constraint that the first tangent bar 502 be parallel to the second tangent bar 506. The modified spline 500' and modified first tangent bar 502' are shown. A portion of the spline has been modified so that the spline 500' remains tangential to the first tangent bar 502' at the point 504. The first tangent bar 502' is longer than the second tangent bar 506, which is why the spline 500' appears to more closely hug the first tangent bar 502' in the region of the point 504 than the spline 500' hugs the second tangent bar 506 in the region of the point 508.

Figure 5E:
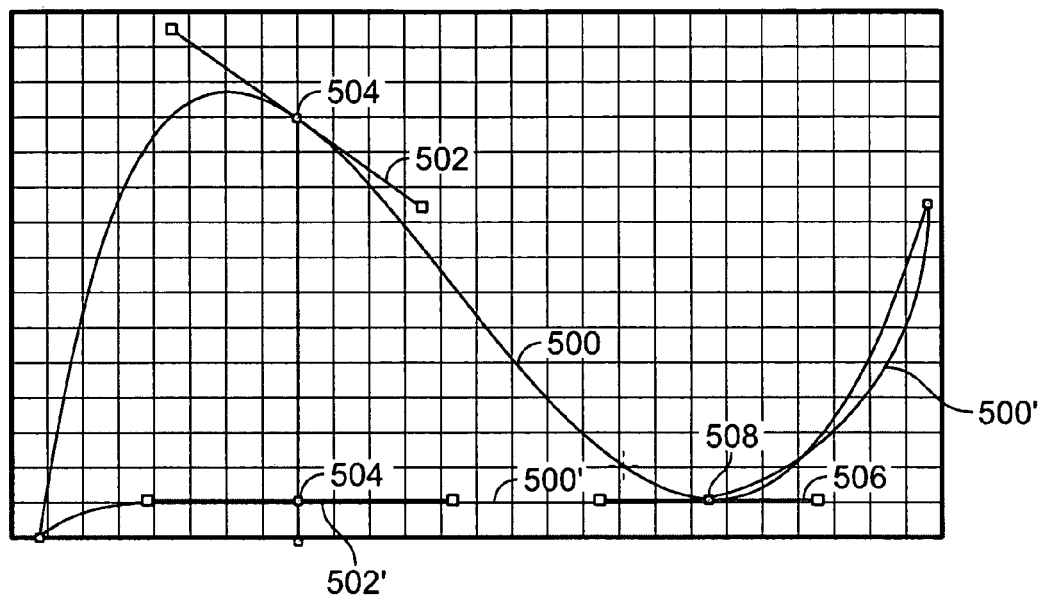

Referring to FIG. 5E, a user can input a constraint that the first tangent bar 502 be collinear with the second tangent bar 506. If the first tangent bar 502 is associated with a point 504 that is constrained in a position (i.e., a fixed point), then applying the collinear constraint to the first tangent bar 502 may result in an error. That is, both constraints cannot coexist and the spline is overconstrained. If the point 504 is a non-fixed point, i.e., a point that is not positionally constrained, then the point 504 can be repositioned to satisfy the collinear constraint relationship applied to the first tangent bar 502. The modified first tangent bar 502' and modified spline 500' is shown. A portion of the spline 500' has been modified, including repositioning point 504, so that the spline 500' remains tangential to the first tangent bar 502 at the point 504. The first tangent bar 502' is longer than the second tangent bar 506, which is why the spline 500' appears to more closely hug the first tangent bar 502' in the region of the point 504 than the spline 500' hugs the second tangent bar 506 in the region of the point 508.

In other implementations, alternate constructions can achieve collinearity. For example, the point 504 can be made collinear to the tangent bar 506, and the tangent bar 502 can be made parallel to the tangent bar 506. To achieve collinearity of the tangent bars 502 and 506 when the points 504 and 508 are fixed, the tangent bars 502, 506 can be rotated until they are collinear with one another.

A user can input a constraint that the first tangent bar 502 be horizontal relative to the coordinate system represented by the x-axis and y-axis. The spline 500 would be modified as shown in FIG. 5D, since constraining the first tangent bar 502 to be parallel to the second tangent bar 504 resulted in a horizontal tangent bar. However, the difference between constraining the first tangent bar 502 to be horizontal and constraining the first tangent bar 502 to be parallel to the second tangent bar 506, is that in the first instance, changes to the angle of the second tangent bar 506 will not affect the horizontal position of the first tangent bar 502. However, in the second instance, changes to the angle of the second tangent bar 506 will affect the angle of the first tangent bar 502 due to the constraint relationship between the first and second tangent bars 502, 506.

A user can input a constraint that the first tangent bar 502 be vertical relative to the coordinate system. The spline 500 would be modified as shown in FIG. 5C, since constraining the first tangent bar 502 to be perpendicular to the second tangent bar 504 resulted in a vertical tangent bar. However, the difference between constraining the first tangent bar 502 to be vertical and constraining the first tangent bar 502 to be perpendicular to the second tangent bar 506, is that in the first instance, changes to the angle of the second tangent bar 506 will not affect the vertical position of the first tangent bar 502. However, in the second instance, changes to the angle of the second tangent bar 506 will affect the angle of the first tangent bar 502 due to the constraint relationship between the first and second tangent bars 502, 506.

Figure 5F:
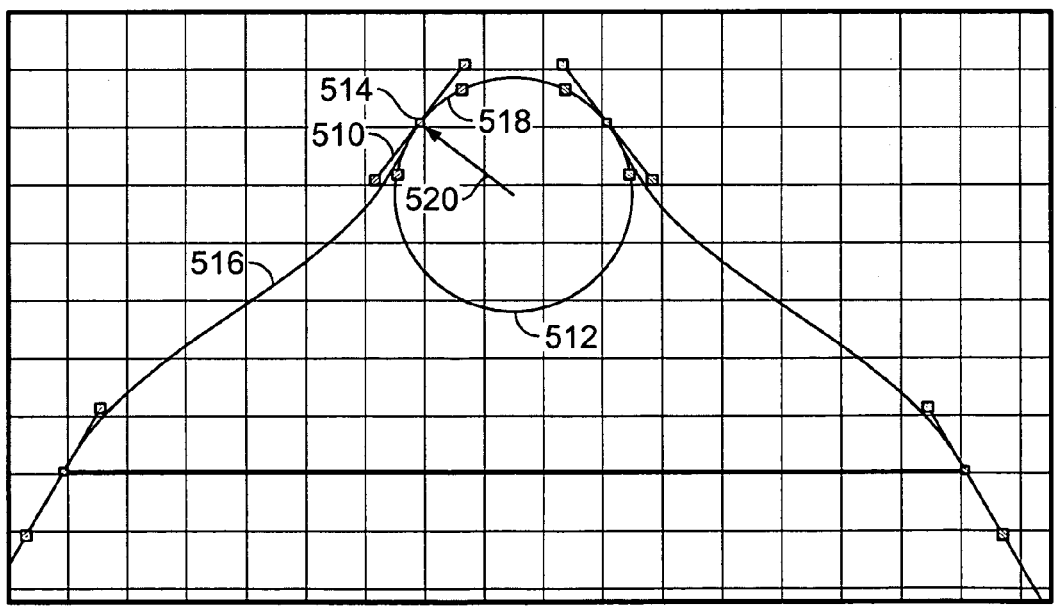

A user can input a constraint that a tangent bar be tangential to a curved graphical element in the design, in addition to the spline in the region of an associated point on the spline. FIG. 5F shows an example of a tangent bar 510 constrained to be tangential to a curve 512, and also shows an example of second order contact. That is, if two curves just touch, e.g., a point on a first curve is constrained to be coincident to a second curve, then there is zero order contact between the curves. If the point on the first curve is thus constrained, and additionally an associated tangent bar is constrained to be tangent to the second curve, then there is first order contact between the curves. If the point on the first curve is thus constrained, an associated tangent bar is constrained to be tangent to the second curve and a radius of curvature of an associated curvature bar is constrained to be equal to a radius of curvature of the second curve, then there is second order contact between the curves. In FIG. 5F, the point 514 is constrained to be coincident to the curve 512. The tangent bar 510 is constrained to be tangential to both the spline 516 at point 514 and the curve 512. The curvature bar 518 is constrained to have a radius of curvature equal to the radius of curvature 520 of the curve 512 at point 514. Accordingly, there is second order contact between the spline 516 and the curve 512 at point 514.

In reference to FIGS. 5A–E above, it should be understood that in one implementation the Geometric Constraint Solver 109 can adjust either a tangent bar or the associated point to satisfy the constraints, insofar as the constraints do not prohibit the adjustments (i.e., to position, dimension, orientation etc.).

Figure 7:
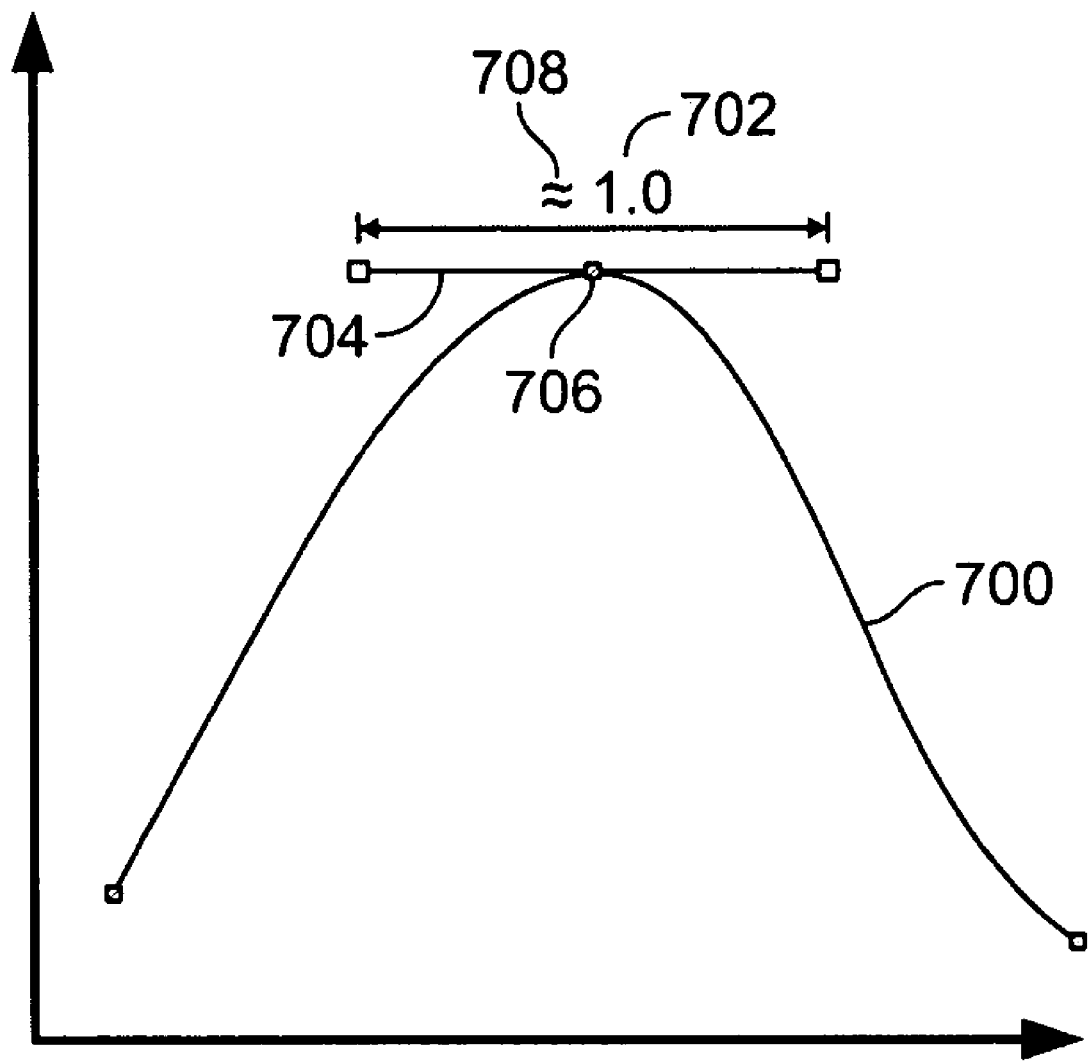
FIG. 7 is a schematic representation of a spline including a tangent bar associated with a point on the spline and having a dimension value.

Referring to FIG. 7, for even more precise control and to insure repeatability for creating a spline 700, the user can associate a dimension value 702 with the tangent bar 704 using a "dimension" command. The dimension can be meaningless in size, in so far as the apparent length of the tangent bar, and the dimension may not be a proportional value. The value can simply represent a magnitude on the spline at the point 706 imposed through the tangent bar 704. A reason for not making the dimension value 702 to scale is to allow for a very large spline to live in the same sketch as a very small spline. In one implementation, an "out-of-scale" indicator 708, e.g., ≈, can be placed in front of a dimension value 702 that is out of scale when displayed to a user in association with a tangent bar 704.

Curvature Bar Engine

Figure 8A:
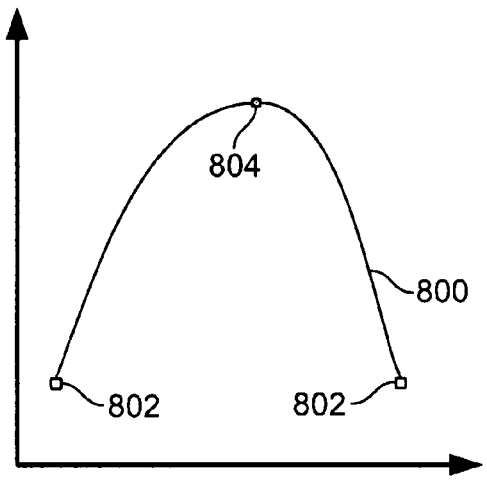
FIG. 8A is a schematic representation of a spline.
Figure 8B:
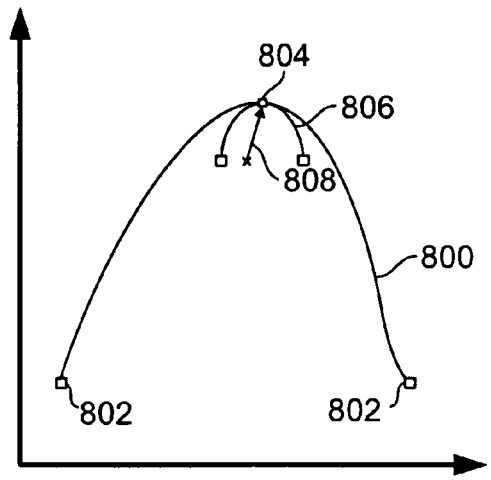
FIG. 8B is a schematic representation of the spline of FIG. 8A with a curvature bar associated with a point on the spline.
Figure 8C:
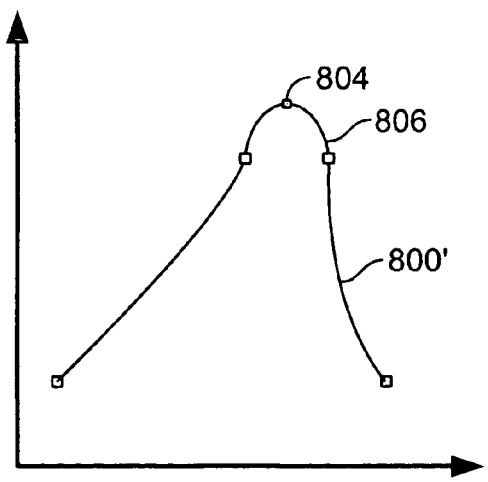
FIG. 8C is a schematic representation of the spline of FIG. 8B modified based on constraints applied to the curvature bar.
Figure 8D:
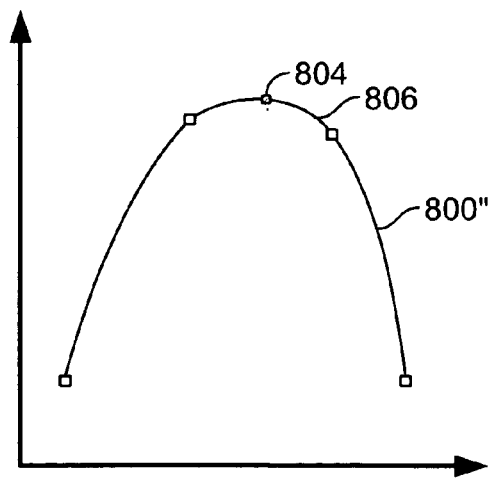
FIG. 8D is a schematic representation of the spline of FIG. 8B modified based on constraints applied to the curvature bar.
Figure 9:
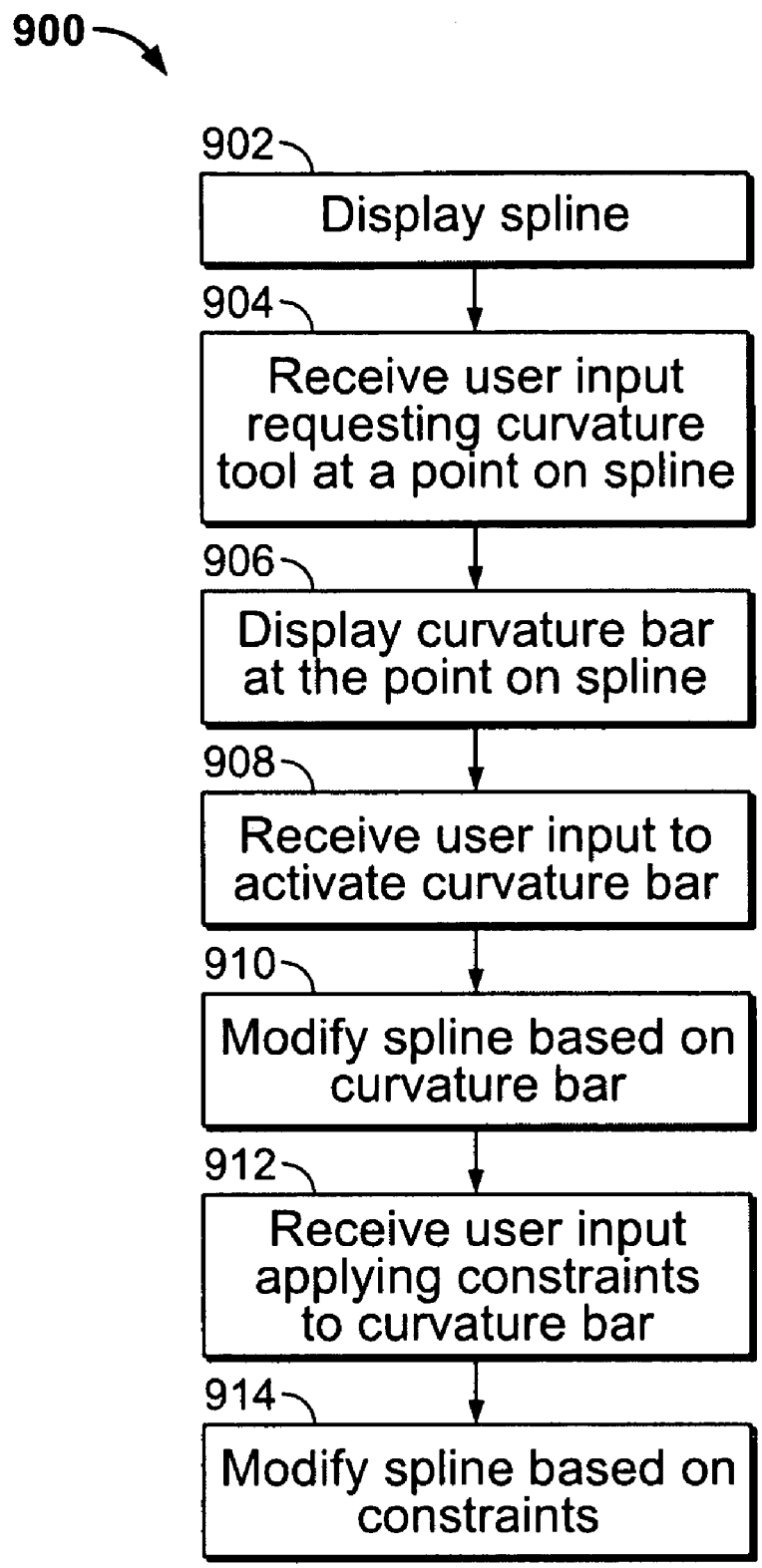
FIG. 9 is a flowchart showing a process for modifying a spline based on constraints applied to a curvature bar associated with a point on the spline.

Referring to FIG. 9, a process 900 for using the curvature tool 206 to modify the shape of a spline is shown. Referring to FIGS. 8A–D, an exemplary spline 800 is shown that can be modified using the process 900 for illustrative purposes.

Referring to FIG. 8A, the spline 800 is displayed to the user, for example, on a computer display monitor (step 902). The spline 800 may have been created by the user using the CAD application 106 or may have been retrieved from a local data store, such as the RAM 108, or from a remote data store over the network connection 114. Points 802 represent the end points of the spline and point 804 represents a point on the spline. The point 804 can be a fit point, which may or may not be positionally fixed; a fit point is a point through which the spline 800 must pass. Other points can be used. For example, in another implementation, the point 804 can be a control point that is not on the spline 800. A user input is received selecting to activate the curvature tool 206 at the point 804 (step 904). For example, a user can position a cursor over the point 804 and activate the right button of a mouse.

Referring to FIG. 8B, in response to the user request, a curvature bar 806 is displayed that passes through the point 804 (step 906). In the embodiment shown, the curvature bar 806 is symmetric about the point 804 and includes nodes on either distal end. The curvature bar 806 is tangential to the spline 800 at the point 804 and has a radius of curvature 808, which in one implementation is different than the radius of curvature of the spline 800 at point 804. A user input can be received to activate the curvature bar 806 (step 908). Referring to FIG. 8C, activating the curvature bar 806 causes the spline 800 to be modified in the region of the point 804 by modifying the radius of curvature of the spline 800 at the point 804 to equal the radius of curvature 808 of the curvature bar 806 (step 910). The initial radius of curvature 808 of the curvature bar 806 can be a default value provided by the curvature tool 206, which may or may not be user selected.

Referring to FIG. 8D, a user can modify the shape of the spline 800 by manipulating the radius of curvature 808 of the curvature bar 806 from the original radius to a second radius. A user can change the radius of curvature 808 of the curvature bar 806, for example, by clicking and dragging on a node of the curvature bar 806. The second radius of curvature defines constraints on the curvature bar 806 (step 912). The shape of the spline 800 is modified based on the constraints applied to the curvature bar 806 (step 914).

Figure 10A:
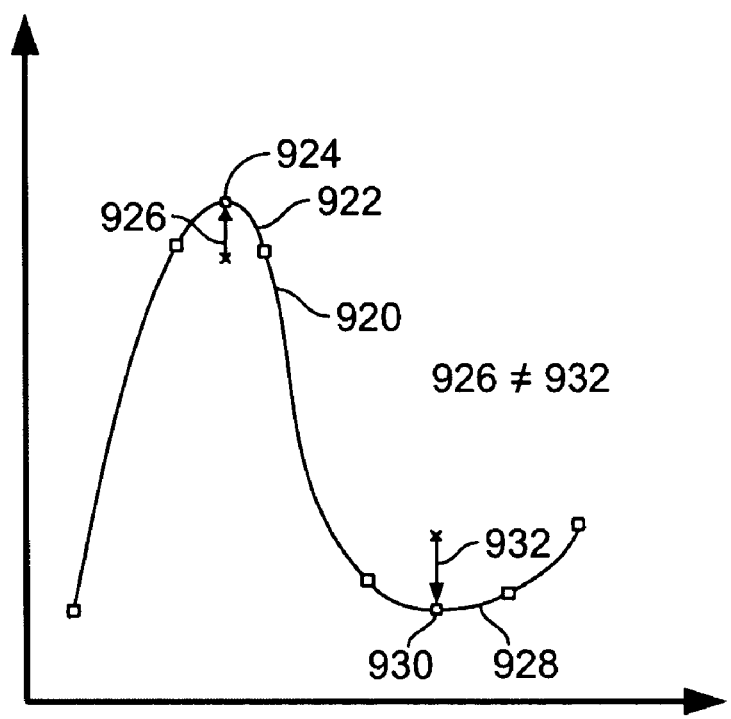
FIGS. 10A–D are schematic representations of a spline including two curvature bars associated with two points on the spline and the spline modified based on constraints applied to the curvature bars.
Figure 10B:
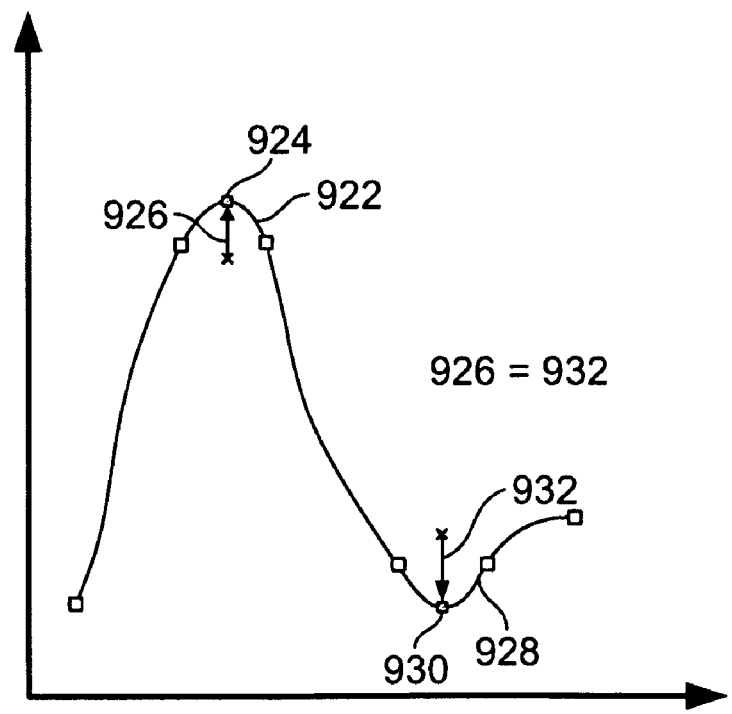

A user can apply constraints to a curvature bar that are relative to either another curvature bar within the design or another graphical element within the design. For example, referring to FIG. 10A, a spline 920 is shown with a first curvature bar 922 at a first point 924. The radius of curvature 926 of the first curvature bar 922 is equal to the radius of curvature of the spline 920 in the region of the first point 924. A second curvature bar 928 is displayed at a second point 930, having a radius of curvature 932 that is different than the radius of curvature 926 of the first curvature bar. A user can input a constraint with respect to the second curvature bar 928 that the radius of curvature 932 equals the radius of curvature 926 of the first curvature bar 922. The radius of curvature of the spline 920 in the region of the second point 930 is modified accordingly, as shown in FIG. 10B.

Figure 10C:
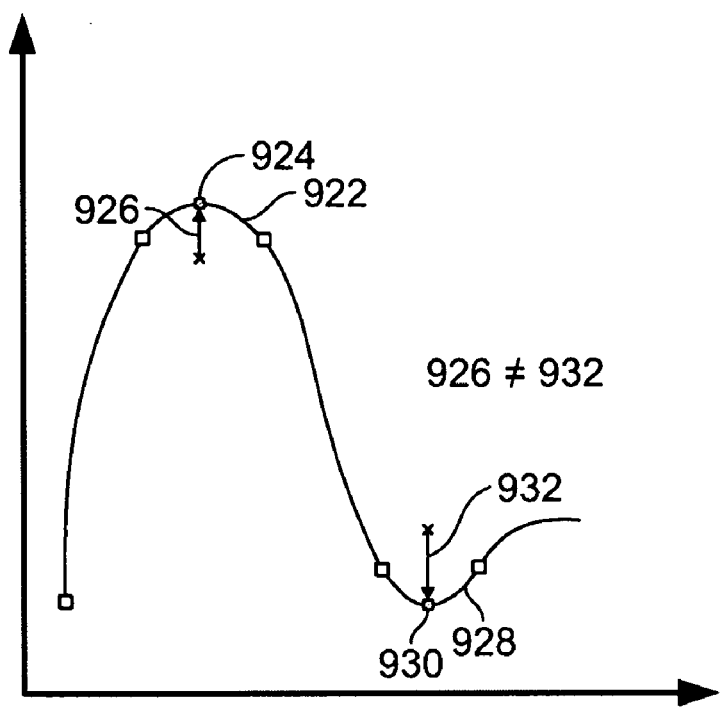
Figure 10D:
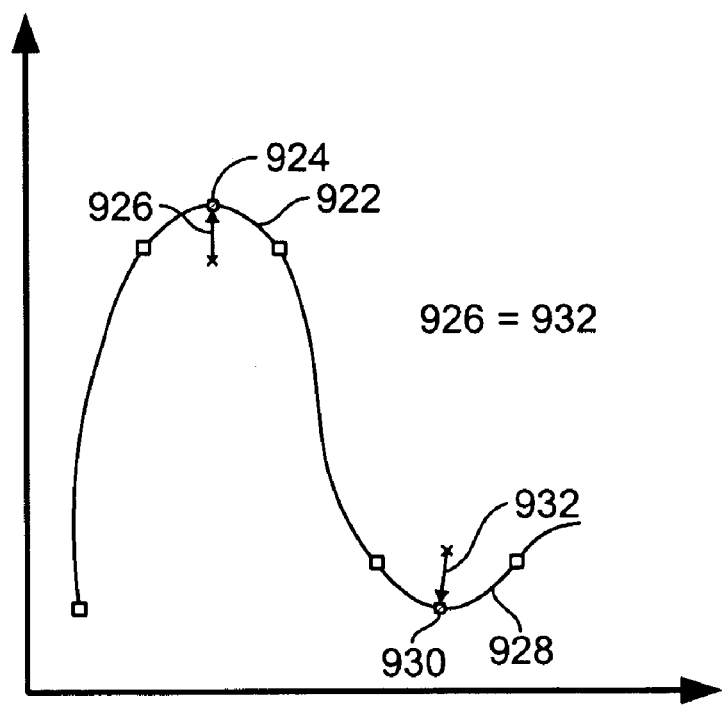

The constraint on the second curvature bar 928 can be maintained, such that subsequent modifications to the radius of curvature 926 of the first curvature bar 922 result in corresponding modifications to the radius of curvature 932 of the second curvature bar 928. For example, referring to FIG. 10C, the radius of curvature 926 of the first curvature bar 922 has been modified. FIG. 10D shows the spline 920 including modifications to maintain the constraint relationship between the radius of curvature 926 of the first curvature bar 922 and the radius of curvature 932 of the second curvature bar 928, which has been correspondingly modified.

Figure 11A:
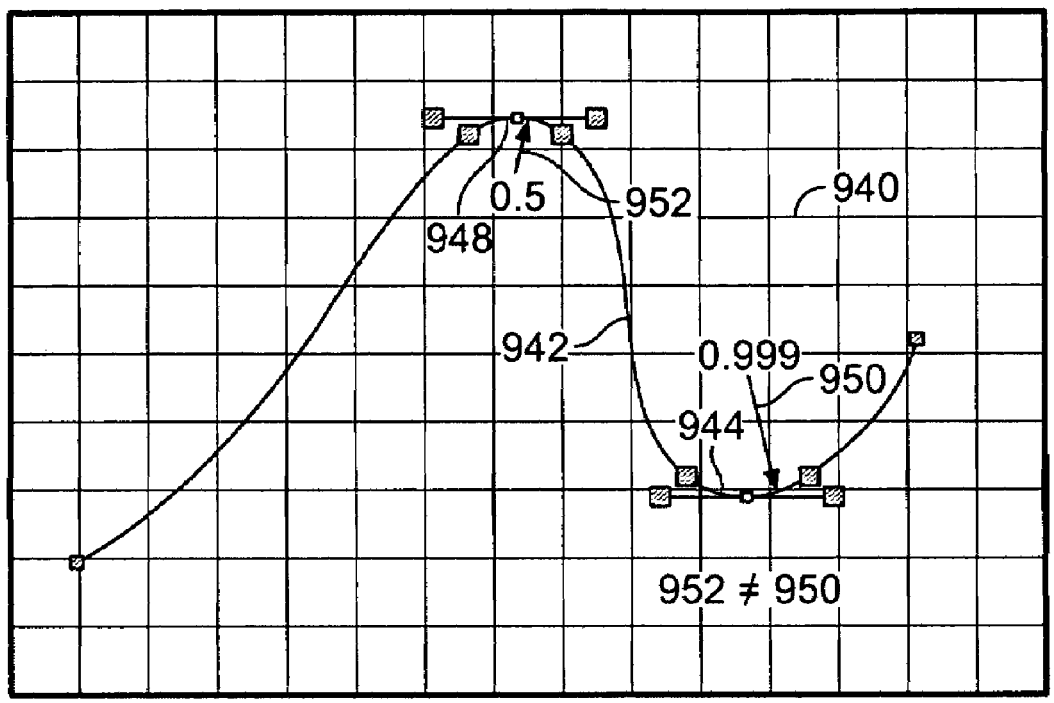
FIG. 11A is a schematic representation of a design including a spline and an arc.
Figure 11B:
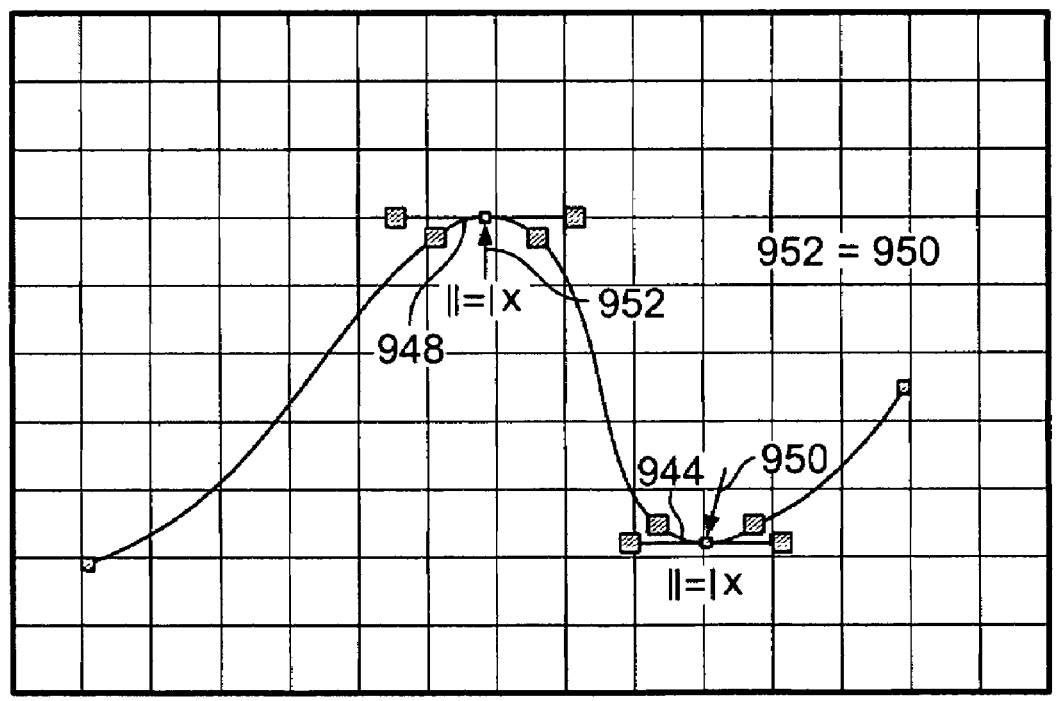
FIG. 11B is a schematic representation of the design of FIG. 11A modified based on constraints applied to a curvature bar associated with a point on the spline.

Referring to FIGS. 11A and 11B, another example is shown of a user applying constraints to a curvature bar that are relative to either another curvature bar within the design or another graphical element within the design. FIG. 11A shows a design 940 including a spline 942 and an arc 944. The spline 942 includes a point 946 and a curvature bar 948 is displayed at the fit point. The arc 944 has a radius of curvature 950. A user can apply a constraint to the curvature bar 948 such that the radius of curvature 952 of the curvature bar 948 is equal to the radius of curvature 950 of the arc 944. FIG. 11B shows the design 940 with the spline 942 modified according to the constraint applied to the curvature bar 948 and the effect of the constraint on the shape of the spline 942 in the region of the point 946.

Figure 12:
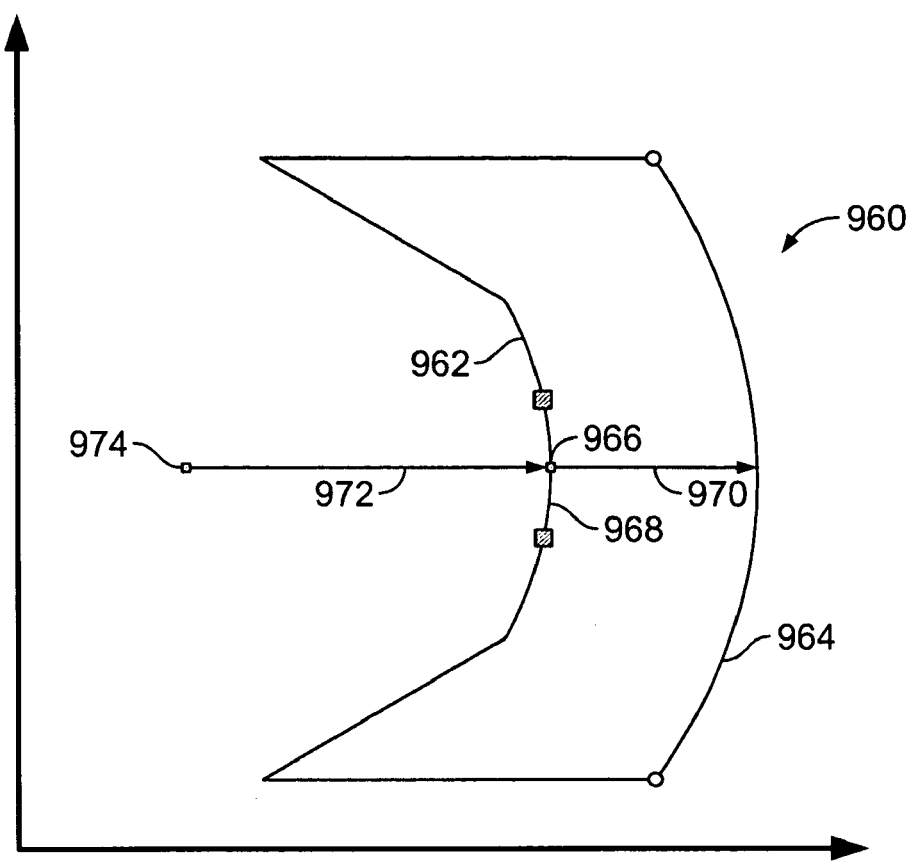
FIG. 12 is a schematic representation of a design including a spline and an arc.

Referring to FIG. 12, another example is shown of a user applying constraints to a curvature bar that are relative to either another curvature bar within the design or another graphical element within the design. FIG. 12 shows a design 960 including a spline 962 and an arc 964. The spline 962 includes a point 966 and a curvature bar 968 is displayed at the point 966. The arc 964 has a radius of curvature 970. A user can apply a constraint to the curvature bar 968 such that the curvature bar 968 can be concentric with the arc 964. The radius of curvature 970 of the arc 964 has a center at point 974. The radius of curvature 972 of the spline at point 966 also has a center at point 974. That is, the spline and the arc 964 are concentric at point 966. If the design 960 is edited to change the center point 974 of the arc 964, the curvature of the spline 962 will be modified accordingly to maintain the constraint relationship between the radius of curvature 972 of the curvature bar 968 and the radius of curvature 970 of the arc 964.

Figure 13:
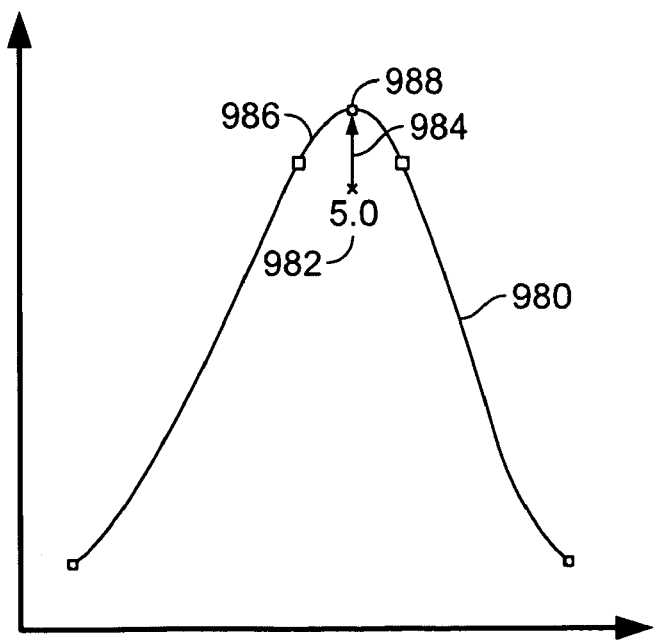
FIG. 13 is a schematic representation of a spline including a curvature bar associated with a point on the spline and having a dimension value.

Referring to FIG. 13, for even more precise control and to insure repeatability for creating a spline 980, the user can place a dimension value 982 on the radius of curvature 984 of the curvature bar 986 at point 988 using a "dimension" command.

Figure 14A:
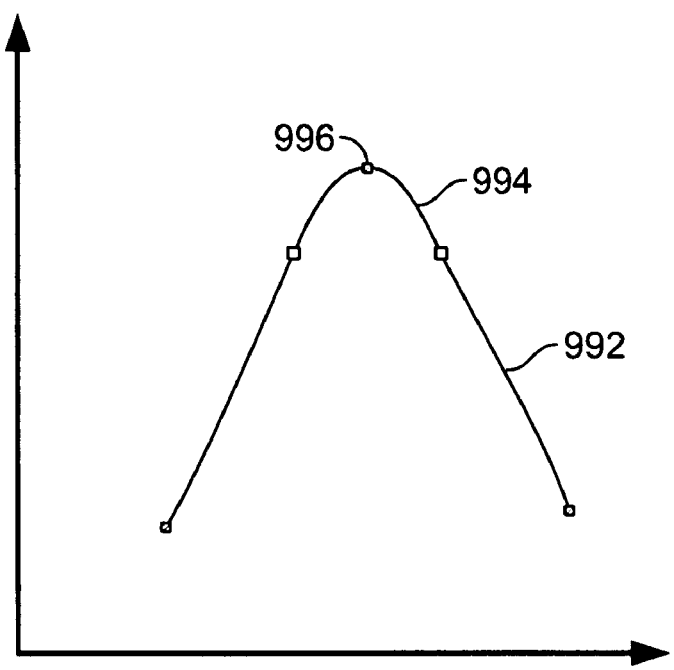
FIG. 14A is a schematic representation of a spline including a curvature bar associated with a point on the spline.
Figure 14B:
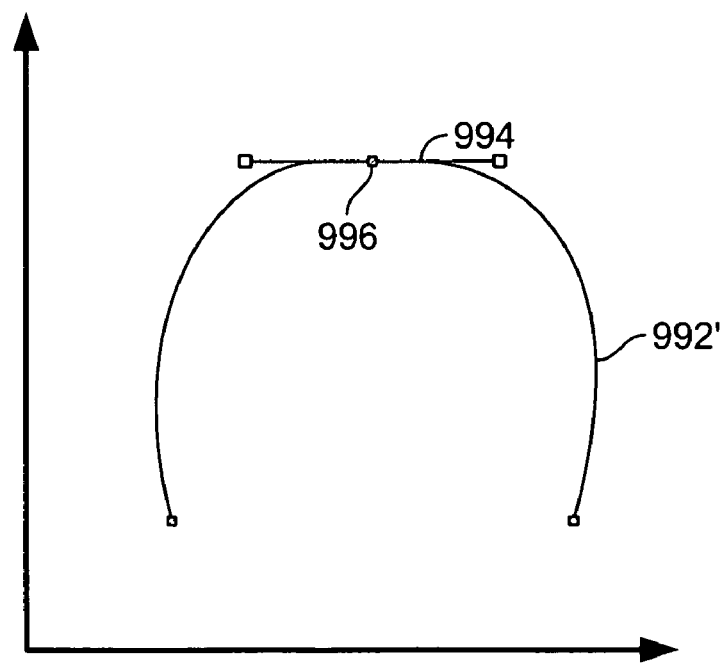
FIG. 14B is a schematic representation of the spline of FIG. 14A modified based on an application of the flat tool to the curvature bar.

A flat tool 208 can be used to apply a radius of curvature approaching infinity to a point on a spline. Referring to FIG. 14A, a spline 992 is shown including a curvature bar 994 associated with a point 996. A user can active the flat tool 208 to change the radius of curvature of the curvature bar 994, such that the curvature bar 994 will appear flat, therefore having a radius of curvature approaching infinity. FIG. 14B shows the effects of the flat tool 208; the spline 992' is modified based on the modified radius of curvature of the curvature bar 994, i.e., the "flat" curvature bar, which results in the spline being substantially flat in the region of the point 996.

The Bowtie Engine 115 can provide a link between the Geometric Constraint Solver 109 and the Spline Solver 111, such that the construction of a spline can be parameterized. Changing the values of the parameters can create a family of related splines. For example, a design of a product that is available in three different sizes can be replicated in different sizes by changing the length parameters, such as the distances between fit points and the radii of curvature of related curvature bars. Uniform or non-uniform scaling can be achieved.

Figure 15:
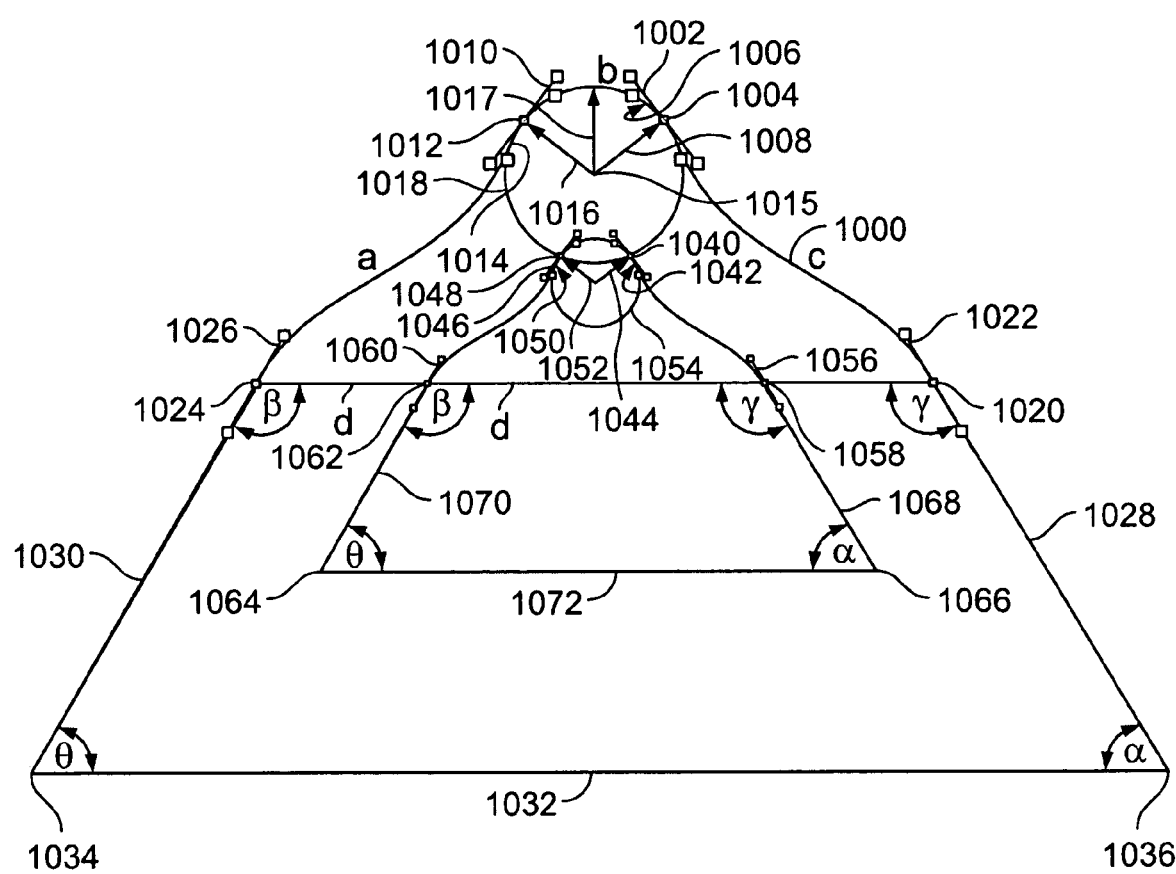
FIG. 15 shows a design and a smaller scale of the design.

Referring to FIG. 15 an example of a design is shown in an original scale and a smaller scale. The design is formed from graphical elements including a spline 1000, a circular element and a trapezoidal element. Referring to the design in the original scale, the spline 1000 can be described with reference to the following parameters:

a first tangent bar 1026 associated with a first endpoint 1024;
a second tangent bar 1010 associated with a point 1012;
a curvature bar 1014 associated with the point 1012 and having a radius of curvature 1016;
a third tangent bar 1002 associated with a point 1004;
a curvature bar 1006 associated with the point 1004 and having a radius of curvature 1008;
a fourth tangent bar 1022 associated with a second endpoint 1020;
a distance between the first endpoint 1024 and the point 1012 of a;
a distance between the points 1012 and 1004 of b;
a distance between the point 1004 and the second endpoint of 1020 of c; and
a distance between the first and second endpoints 1024 and 1020 of d The circular element can be described with reference to a position of a center point 1015 and a radius 1017.

The trapezoidal element can be described with reference to:
a first line having endpoints 1034 and 1024;
a second line having endpoints 1024 and 1020;
an angle between the first line and the second line of $\beta$;
a third line having endpoints 1020 and 1036;
an angle between the second line and the third line of $\gamma$;
a fourth line having endpoints 1036 and 1034;
an angle between the third line and the fourth line of $\alpha$;
an angle between the fourth line and the first line of $\theta$.

In one implementation, to create the smaller scale version of the design, the above parameters that describe the design can be scaled accordingly. Dimension values, such as distances between points and radii of curvature, can be scaled. Other values, such as the angular orientation of tangent bars and the angles between lines may not be variant, i.e., they remain unchanged at different scales.

Referring to the smaller scale version of the design, the spline 1000 includes first and second endpoints 1062, 1058 that are associated with tangent bars 1060 and 1056. The tangent bars are collinear with the lines forming the left and right sides of the trapezoidal element. The distance d' between the first and second endpoints 1062, 1058 is scaled down from the distance d between the corresponding first and second endpoints 1024, 1020 in the original scale version. Similarly, distances between other points describing the spline 1000 are scaled down from the corresponding distances in the original scale version. The radii of curvature 1052, 1044 of the curvature bars 1046, 1042 in the smaller scale version are scaled down from the corresponding radii of curvature 1016, 1008 of the curvature bars 1010, 1002 in the original scale version.

Scaling can be uniform or non-uniform. For example, patterns used for clothing garments can require non-uniform scaling from one pattern size to the next. That is, for example, the length of a shirt sleeve may be scaled by a different factor than the circumference of the sleeve. The use of the Bowtie Engine 115, that is, the tangent bars, curvature bars and associated points, and the corresponding parameters can facilitate uniform and non-uniform scaling as described above. That is, being able to describe a spline using these parameters, scaling, either uniformly or non-uniformly, can be achieved by scaling the parameters accordingly, thereby describing the same spline at a different scale.

In one implementation, the curvature tool 206 is presented to a user in conjunction with the tangent tool 204. In another implementation, a curvature tool 206 can be available to a user independent of the tangent tool 204, and visa versa.

In one implementation, manipulations of a curvature bar associated with a point can influence attributes of a tangent bar associated with the same point. For example, if a radius of curvature is significantly decreased, a length of the tangent bar may also be decreased, since the length of the tangent bar effects how the spline hugs the tangent bar, and therefore is related to the curvature of the spline. Similarly, the converse can be true. That is, manipulations of the tangent bar can influence attributes of a corresponding curvature bar.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Accordingly, other embodiments are within the scope of the following claims. For example, different embodiments may choose to not allow dimensions on tangent bars. If dimensions are supported, various techniques can be used to convert such dimensions into values supported by the Spline Solver 11I, e.g., derivatives. Furthermore, constraint types in addition to the exemplary constraint types discussed above can be supported without departing from the scope of the invention. The logic flows depicted in FIGS. 3, 6 and 9 do not require the particular order shown, or sequential order, to achieve desirable results, and the steps of the invention can be performed in a different order and still achieve desirable results.

What is claimed is:

1. A computer implemented method, comprising:
   displaying a spline included in an assembly of graphical elements having at least one other graphical element;
   displaying a tangent bar tangent to a point on the spline;
   receiving a user input defining one or more constraints on the tangent bar, where a constraint constrains the tangent bar relative to the other graphical element;
   modifying the spline based on the one or more constraints on the tangent bar; and
   in response to a modification to the other graphical element, determining if the spline must be further modified to maintain the one or more constraints on the tangent bar relative to the other graphical element and, if so, further modifying the spline based on the one or more constraints on the tangent bar.

2. The method of claim 1, wherein:
   the one or more constraints include a constraint on an orientation of the tangent bar relative to the graphical element.

3. The method of claim 2, wherein:
   the assembly includes a linear graphical element; and
   the one or more constraints include a constraint wherein the orientation of the tangent bar is perpendicular to the linear graphical element.

4. The method of claim 2, wherein:
   the assembly includes a linear graphical element; and
   the one or more constraints include a constraint wherein the orientation of the tangent bar is parallel to the linear graphical element.

5. The method of claim 2, wherein:
the assembly includes a linear graphical element; and
the one or more constraints include a constraint wherein the orientation of the tangent bar is collinear with the linear graphical element.

6. The method of claim 2, wherein:
the assembly includes a curved graphical element; and
the one or more constraints include a constraint wherein the orientation of the tangent bar is tangent to the curved graphical element.

7. The method of claim 1, wherein:
the other graphical element is a second tangent bar; and
the one or more constraints include a constraint wherein the dimension of the tangent bar is equal to a dimension of the second tangent bar.

8. The method of claim 1, wherein:
the one or more constraints include a constraint on a dimension of the tangent bar relative to the other graphical element; and
modifying the spline comprises modifying how much of a length of the spline is substantially tangential to the tangent bar.

9. The method of claim 8, wherein:
the constraint includes increasing the dimension of the tangent bar; and
modifying the spline comprises increasing how much of the length of the spline that is substantially tangential to the tangent bar.

10. The method of claim 8, wherein:
the constraint includes decreasing the dimension of the tangent bar; and
modifying the spline comprises decreasing how much of the length of the spline that is substantially tangential to the tangent bar.

11. A computer implemented method, comprising:
displaying a spline;
displaying a curvature bar at a point on the spline, the curvature bar having a radius of curvature,
receiving a user input defining the radius of curvature of the curvature bar; and
modifying a curvature of the spline at the point in accordance with the radius of curvature of the curvature bar.

12. The method of claim 11, further comprising:
receiving a user input defining one or more constraints on the curvature bar; and
wherein modifying the curvature of the spline comprises modifying a radius of curvature of the spline based on the one or more constraints on the curvature bar.

13. The method of claim 12, wherein:
one of the constraints includes a constraint that the radius of curvature of the curvature bar is approximately infinite; and
modifying the curvature of the spline comprises modifying the spline to be approximately flat in a region including the point.

14. The method of claim 12, wherein:
the spline is included in an assembly of graphical elements having at least one other graphical element; and
the one or more constraints include a constraint on the radius of curvature of the curvature bar relative to the graphical element.

15. The method of claim 14, wherein:
the assembly includes a curved graphical element; and
the one or more constraints include a constraint wherein the radius of curvature of the curvature bar is equal to a radius of curvature of the curved graphical element.

16. The method of claim 14, wherein:
the assembly includes a curved graphical element; and
the one or more constraints include a constraint wherein the curvature bar is concentric to the curved graphical element.

17. A computer implemented method, comprising:
displaying a spline;
displaying a tangent bar tangent to a point On the spline;
displaying a curvature bar at the point on the spline;
receiving a user input defining one or more constraints on at least one of the tangent bar or the curvature bar; and
modifying a shape of the spline based on the one or more constraints.

18. A system for manipulating a spline within a design, comprising:
a geometric constraint solver, configured to:
resolve constraints applied to graphical elements comprising a design, including constraints applied to a tangent bar associated with a first graphical element included in the design where the constraints are relative to a second graphical element included in the design; and
provide geometric input to a spline solver;
the spline solver configured to:
generate a spline based on geometric input received from the geometric constraint solver;
a tangent bar engine configured to:
display a tangent bar that is tangent to a point on a spline, the spline being a first graphical element included in a computer-aided design having at least a second graphical element;
receive user input defining one or more constraints on the tangent bar, where the one or more constraints constrain the tangent bar relative to the second graphical element; and
provide the one or more constraints to the geometric constraint solver;
the one or more constraints being used by the geometric constraint solver to generate the geometric input provided to the spline solver.

19. The system of claim 18, wherein the one or more constraints include a restriction on at least one of a dimension, orientation or position of the tangent bar relative to the second graphical element.

20. The system of claim 18, wherein the second graphical element is a linear element and the orientation of the tangent bar is constrained to be parallel to the linear element.

21. The system of claim 18, wherein the second graphical element is a linear element and the orientation of the tangent bar is constrained to be perpendicular to the linear element.

22. The system of claim 18, wherein the second graphical element is a linear element and the orientation of the tangent bar is constrained to be collinear with the linear graphical element.

23. The system of claim 18, wherein the second graphical element is a curve and the orientation of the tangent bar is constrained to be tangential to the curve.

24. The system of claim 18, wherein the one or more constraints include a constraint on a dimension of the tangent bar relative to the second graphical element included in the design.

25. The system of claim 24, wherein the second graphical element is a second tangent bar having a second dimension.

26. The system of claim 18, wherein the geometric constraint solver is further configured to resolve constraints including constraints applied to a curvature bar associated with a graphical element included in the design, the system further comprising:
a curvature bar engine configured to:
display a curvature bar at a point on a spline, the curvature bar having a radius of curvature;
receive a user input defining one or more constraints on the curvature bar; and
provide the one or more constraints to the geometric constraint solver;
the one or more constraints being used by the geometric constraint solver to generate the geometric input provided to the spline solver.

27. A system for manipulating a spline within a design, comprising:
a geometric constraint solver, configured to:
resolve constraints applied to graphical elements comprising a design, including constraints applied to a curvature bar associated with a graphical element included in the design; and
provide geometric input to a spline solver;
the spline solver configured to:
generate a spline based on geometric input received from the geometric constraint solver;
a curvature bar engine configured to:
display a curvature bar at a point on a spline, the curvature bar having a radius of curvature;
receive a user input defining one or more constraints on the curvature bar; and
provide the one or more constraints to the geometric constraint solver;
the one or more constraints being used by the geometric constraint solver to generate the geometric input provided to the spline solver.

28. The system of claim 27, wherein the one or more constraints include a constraint on the radius of curvature of the curvature bar relative to a graphical element included in the design.

29. The system of claim 28, wherein the graphical element is an arc and the radius of curvature of the curvature bar is constrained to be equal to the radius of curvature of the arc.

30. The system of claim 28, wherein the graphical element is an arc and a position of the curvature bar is constrained to be concentric to the arc.

31. A computer program product, tangibly stored on a computer-readable medium, comprising instructions operable to cause a programmable processor to:
display a spline included in an assembly of graphical elements having at least one other graphical element;
display a tangent bar tangent to a point on the spline;
receive a user input defining one or more constraints on the tangent bar, where a constraint constrains the tangent bar relative to the other graphical element;
modify the spline based on the one or more constraints on the tangent bar; and
in response to a modification to the other graphical element, determine if the spline must be further modified to maintain the one or more constraints on the tangent bar relative to the other graphical element and, if so, further modifying the spline based on the one or more constraints on the tangent bar.

32. The computer program product of claim 31, wherein: the one or more constraints include a constraint on an orientation of the tangent bar relative to the other graphical element.

33. The computer program product of claim 32, wherein:
the assembly includes a linear graphical element; and
the one or more constraints include a constraint wherein the orientation of the tangent bar is perpendicular to the linear graphical element.

34. The computer program product of claim 32, wherein:
the assembly includes a linear graphical element; and
the one or more constraints include a constraint wherein the orientation of the tangent bar is parallel to the linear graphical element.

35. The computer program product of claim 32, wherein:
the assembly includes a linear graphical element; and
the one or more constraints include a constraint wherein the orientation of the tangent bar is collinear with the linear graphical element.

36. The computer program product of claim 32, wherein:
the assembly includes a curved graphical element; and
the one or more constraints include a constraint wherein the orientation of the tangent bar is tangent to the curved graphical element.

37. The computer program product of claim 31, wherein:
the other graphical element is a second tangent bar; and
the one or more constraints include a constraint wherein the dimension of the tangent bar is equal to a dimension of the second tangent bar.

38. The computer program product of claim 31, wherein:
the one or more constraints include a constraint on a dimension of the tangent bar relative to the other graphical element; and
instructions operable to modify the spline comprise instructions operable to modify how much of a length of the spline is substantially tangential to the tangent bar.

39. The computer program product of claim 38, wherein:
the constraint includes increasing the dimension of the tangent bar; and
instructions operable to modify the spline comprise instructions operable to increase how much of the length of the spline that is substantially tangential to the tangent bar.

40. The computer program product of claim 38, wherein:
the constraint includes decreasing the dimension of the tangent bar; and
instructions operable to modify the spline include instructions operable to decrease how much of the length of the spline that is substantially tangential to the tangent bar.

41. A computer program product, tangibly stored on a computer-readable medium, comprising instructions operable to cause a programmable processor to:
display a spline;
display a curvature bar at a point on the spline, the curvature bar having a radius of curvature;
receive a user input defining the radius of curvature of the curvature bar; and
modify a curvature of the spline at the point in accordance with the radius of curvature of the curvature bar.

42. The computer program product of claim 41, further comprising instructions operable to:
receive a user input defining one or more constraints on the curvature bar; and
wherein instructions operable to modify the curvature of the spline comprise instructions operable to modify a radius of curvature of the spline based on the one or more constraints on the curvature bar.

43. The computer program product of claim 42, wherein:
one of the constraints includes a constraint that the radius of curvature of the curvature bar is approximately infinite; and
instructions operable to modify the curvature of the spline comprise instructions operable to modify the spline to be approximately flat in a region including the point.

44. The computer program product of claim 42, wherein:
the spline is included in an assembly of graphical elements having at least one other graphical element; and
the one or more constraints include a constraint on the radius of curvature of the curvature bar relative to the graphical element.

45. The computer program product of claim 44, wherein:
the assembly includes a curved graphical element; and
the one or more constraints include a constraint wherein the radius of curvature of the curvature bar is equal to a radius of curvature of the curved graphical element.

46. The computer program product of claim 44, wherein:
the assembly includes a curved graphical element; and
the one or more constraints include a constraint wherein the curvature bar is concentric to the curved graphical element.

47. A computer program product, tangibly stored on a computer-readable medium, comprising instructions operable to cause a programmable processor to:
display a spline;
display a tangent bar tangent to a point on the spline;
display a curvature bar at the point on the spline;
receive a user input defining one or more constraints on at least one of the tangent bar or the curvature bar; and
modify a shape of the spline based on the one or more constraints.

48. A system for manipulating a spline within a design, comprising:
a constraint solver that receives constraint input applied to graphical elements comprising a design, including constraints applied to a tangent bar associated with a first graphical element included in the design where the constraints are relative to a second graphical element included in the design, and provides geometric input to a spline solver based on the constraint input;
the spline solver configured to receive geometric input from the constraint solver and generate a spline in accordance with the geometric input;
a tangent bar engine that receives user input defining one or more constraints on a tangent bar that is tangent to a point on a spline, the spline being a first graphical element included in a computer-aided design having at least a second graphical element where the one or more constraints constrain the tangent bar relative to the second graphical element, and provides the one or more constraints to the constraint solver.

49. A system for manipulating a spline within a design, comprising:
a constraint solver that receives constraint input applied to graphical elements comprising a design, including constraints applied to a curvature bar associated with a graphical element included in the design, and provides geometric input to a spline solver based on the constraint input;
the spline solver configured to receive geometric input from the constraint solver and generate a spline in accordance with the geometric input;
a curvature bar engine that receives user input defining one or more constraints on a curvature bar that define a radius of curvature of a spline at a point and provides the one or more constraints to the constraint solver.

50. A computer implemented method, comprising:
displaying a spline included in an assembly of graphical elements having at least one other graphical element;
displaying a curvature bar at a point on the spline, the curvature bar having a radius of curvature;
receiving a user input defining one or more constraints on the radius of curvature of the curvature bar, where a constraint constrains the curvature bar relative to the other graphical element and where the other graphical element can be a second curvature bar;
modifying a curvature of the spline at the point in accordance with the one or more constraints on the radius of curvature of the curvature bar; and
in response to a modification to the other graphical element, determining if the spline must be further modified to maintain the one or more constraints on the radius of curvature of the curvature bar, and if so, further modifying the spline based on the one or more constraints on the radius of curvature of the curvature bar.

51. The method of claim 50, wherein:
the second graphical element is a curved graphical element; and
the one or more constraints include a constraint wherein the radius of curvature of the curvature bar is equal to a radius of curvature of the curved second graphical element.

52. The method of claim 50, wherein:
the second graphical element is a curved graphical element; and
the one or more constraints include a constraint wherein the curvature bar is concentric to the curved graphical element.

53. A system for manipulating a spline within a design, comprising:
a geometric constraint solver, configured to:
resolve constraints applied to graphical elements comprising a design, including constraints applied to a curvature bar associated with a first graphical element included in the design where the constraints applied to the curvature bar are relative to a second graphical element included in the design; and
provide geometric input to a spline solver;
the spline solver configured to;
generate a spline based on geometric input received from the geometric constraint solver;
a curvature bar engine configured to:
display a curvature bar at a point on a spline, the curvature bar having a radius of curvature, the spline being the first graphical element included in a computer-aided design having at least a second graphical element;
receive a user input defining one or more constraints on the curvature bar, where the one or more constraints constrain the curvature bar relative to the second graphical element; and
provide the one or more constraints to the geometric constraint solver;
the one or more constraints being used by the geometric constraint solver to generate the geometric input provided to the spline solver.

54. The system of claim 53, wherein the second graphical element is an arc and the radius of curvature of the curvature bar is constrained to be equal to the radius of curvature of the arc.

55. The system of claim 53, wherein the second graphical element is an arc and a position of the curvature bar is constrained to be concentric to the arc.

56. A computer program product, tangibly stored on a computer-readable medium, comprising instructions operable to cause a programmable processor to:
- display a spline included in an assembly of graphical elements having at least one other graphical element;
- display a curvature bar at a point on the spline, the curvature bar having a radius of curvature;
- receive a user input defining the radius of curvature of the curvature bar, where a constraint constrains the curvature bar relative to the other graphical element;
- modify a curvature of the spline at the point in accordance with the radius of curvature of the curvature bar; and
- in response to a modification to the other graphical element, determine if the spline must be further modified to maintain the one or more constraints on the radius of curvature of the curvature bar and, if so, further modifying the spline based on the one or more constraints on the radius of curvature of the curvature bar.

57. The computer program product of claim 56, wherein:
- the second graphical element is a curved graphical element; and
- the one or more constraints include a constraint wherein the radius of curvature of the curvature bar is equal to a radius of curvature of the curved second graphical element.

58. The computer program product of claim 56, wherein:
- the second graphical element is a curved graphical element; and
- the one or more constraints include a constraint wherein the curvature bar is concentric to the curved second graphical element.

* * * * *